United States Patent

Izumi et al.

[11] Patent Number: 6,104,457
[45] Date of Patent: Aug. 15, 2000

[54] SEALED MULTI-PANEL LIQUID CRYSTAL DISPLAY DEVICE AND METHOD OF MANUFACTURING THE SAME

[75] Inventors: Yoshihiro Izumi, Kashihara; Koichi Fujimori, Nabari, both of Japan

[73] Assignee: Sharp Kabushiki Kaisha, Osaka, Japan

[21] Appl. No.: 09/082,765

[22] Filed: May 21, 1998

[30] Foreign Application Priority Data

Jun. 13, 1997 [JP] Japan .................................. 9-157136
Jun. 27, 1997 [JP] Japan .................................. 9-172554

[51] Int. Cl.[7] .................................................. G03F 01/133
[52] U.S. Cl. ............................ 349/73; 349/153; 349/187
[58] Field of Search .............................. 349/73, 187, 153

[56] References Cited

U.S. PATENT DOCUMENTS

| 4,408,836 | 10/1983 | Kikuno ........................................... 349/73 |
| 4,832,457 | 5/1989 | Saitoh et al. ................................. 349/73 |
| 5,106,197 | 4/1992 | Ohuchida et al. ........................... 349/73 |
| 5,654,781 | 8/1997 | Izumi ........................................... 349/73 |
| 5,661,531 | 8/1997 | Greene et al. ............................... 349/73 |
| 5,812,226 | 9/1998 | Izumi et al. ................................. 349/73 |
| 5,835,181 | 11/1998 | Nakamura et al. ......................... 349/189 |
| 5,838,405 | 11/1998 | Izumi et al. ................................. 349/73 |
| 5,847,785 | 12/1998 | Izumi ........................................... 349/73 |

*Primary Examiner*—William L. Sikes
*Assistant Examiner*—Tarifur R. Chowdhury
*Attorney, Agent, or Firm*—David G. Conlin; David A. Tucker

[57] ABSTRACT

A method of manufacturing a multi-panel liquid crystal display device prepared by connecting a liquid crystal multi-panel having a plurality of display surfaces to a reinforcing substrate includes the steps of: (a) forming a pattern of a seal material on at least one of a surface of the liquid crystal multi-panel and a surface of the reinforcing substrate; (b) connecting the liquid crystal multi-panel and the reinforcing substrate via the seal material; (c) injecting a bonding material into a spacing formed by the liquid crystal multi-panel, the reinforcing substrate and the seal material; and (d) hardening the bonding material. The described method permits the amount of use of the bonding material required for connecting the liquid crystal multi-panel and the reinforcing substrate to be minimized. As a result, the need of wasting or refining the excessive bonding material can be eliminated, thereby reducing a manufacturing cost.

28 Claims, 17 Drawing Sheets

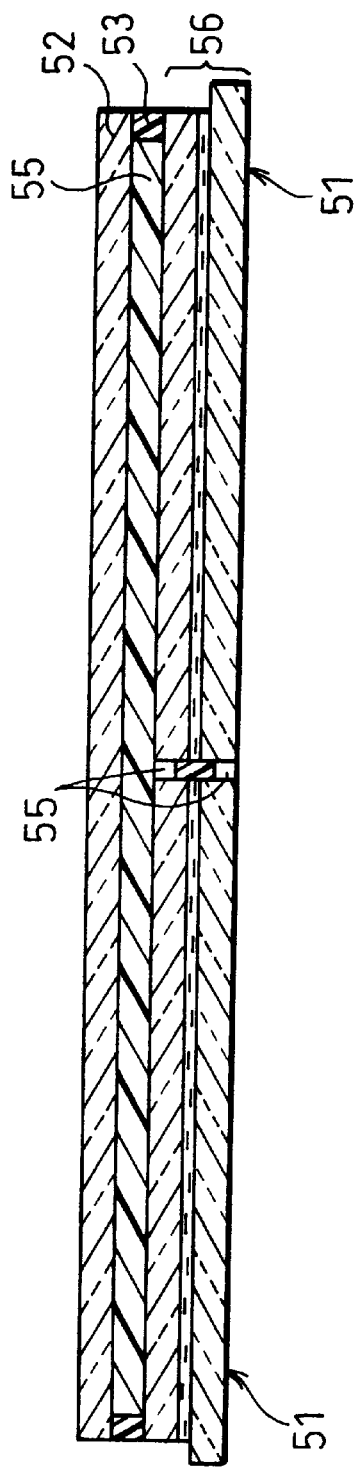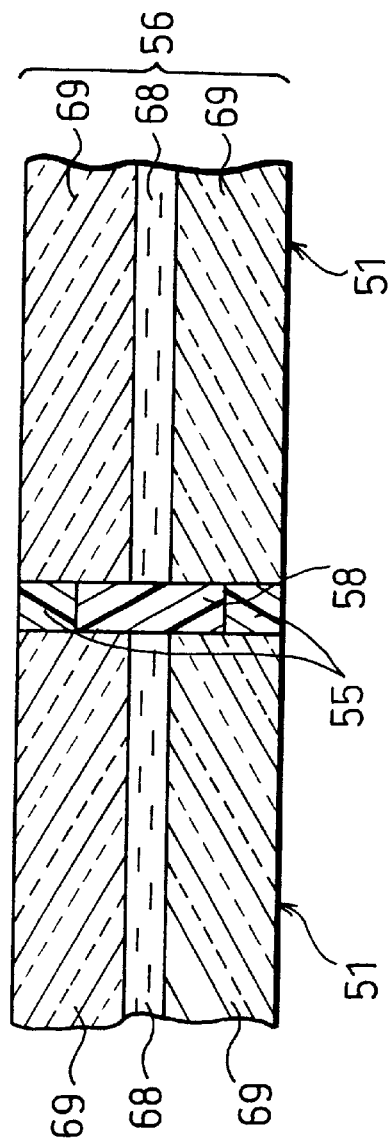
FIG. 8(a)
FIG. 8(b)

DEAERATION

INJECTION OF BONDING MATERIAL

SEALED MULTI-PANEL LIQUID CRYSTAL DISPLAY DEVICE AND METHOD OF MANUFACTURING THE SAME

FIELD OF THE INVENTION

The present invention relates to a multi-panel liquid crystal display device prepared by connecting a plurality of liquid crystal panels and a method of manufacturing the same.

BACKGROUND OF THE INVENTION

Recently, there is an increasing demand for a high-definition large-screen display which is lighter, thinner and less-power-consuming for use in a TV set representing AV systems intended for home use or OA systems. To meet this demand, the development of the large-screen displays including a CRT (Cathode Ray Tube), an LCD (Liquid Crystal Display), a PDP (Plasma Display Panel), and EL (Electroluminescent) display, and an LED (Light Emitting Diode) all have be proceeding toward practical use.

The the liquid crystal display devices have advantageous features over other display devices in that liquid crystal display devices have the least depth (thickness); consume less power; and easily display full color images. Thus, liquid crystal displays have been applied to various fields, and the development of practical large-screen liquid crystal display devices has long been expected.

However, it is known that the mortality rate of liquid crystal display devices increases when the screen thereof is upsized. This is because of signal disconnection or imperfect pixels created during the manufacturing process. In addition, high cost is required due to the complicated process for manufacturing large-screen liquid crystal displays.

In order to eliminate these problems, multi-panel liquid crystal display devices have been proposed in which a large screen is provided by electrically and mechanically interconnecting a plurality of small substrates in a side-by side array. A problem arises, however, in that the joints between However, when adopting the described liquid crystal display devices of the multi-panel display system, a problem arises in that the joints between the liquid crystal panels stand out due to a leakage of light through the mechanical connections between the sides of the substrates forming the array. Therefore, techniques for making these joints difficult to see are required in order to realize liquid crystal display devices which offer natural large screen images.

To achieve this a multi-panel liquid crystal display device in which the joints do not stand out has been proposed in Japanese Unexamined Patent Publication No. 122769/1996 (Tokukaihei 8-122769). FIG. 15 is a plan view showing a schematic structure of a liquid crystal display device 151 of the above publication. FIG. 16 is a cross-sectional view of the liquid crystal display device 151 taken along lines X—X.

The liquid crystal display device 151 has a plurality of active matrix liquid crystal panels 152. For simplicity of explanation, the following discussion will be limited to the interrelationship of two liquid crystal panels 152. It should be understood, however, that this discussion is included by way of illustration only, and that the interrelationships of the other adjacent pairs of liquid crystal panels is similar to the exemplary panel pair discussed below.

The liquid crystal panel 151 includes a TFT substrate 153 and a CF (color filter) substrate 154. The TFT substrate 153 and the CF substrate 154 are transparent glass substrates. On the TFT substrate 153, thin film transistors (not shown) are formed in a matrix. On the CF substrate 154, color filters 154a are formed in a matrix. By the described arrangement, an active matrix color liquid crystal panel 152 is realized. On the CF substrate 154, a black matrix (BM) 154b for separating respective pixels is formed. The black matrix 154b is made of a light absorbing film which shows a black color by absorbing light.

The described TFT substrate 153 and the CF substrate 154 are connected by a seal section 155 formed along the periphery thereof. Further, a liquid crystal 156 is sealed between the TFT substrate 153 and the CF substrate 154.

The liquid crystal panels 152 are connected by the bonding material 158. The liquid crystal panels 152 are connected on a large reinforcing substrate 157 also by the bonding material 158. As a result, the liquid crystal panels 152 are adjacently connected on the same plane.

For the bonding material 158 a transparent ultraviolet ray setting bonding material which is accelerated to be hardened with an application of an ultraviolet ray may be adopted. The bonding material 158 has the same refraction factor as the two glass substrates which constitute the TFT substrate 153 and the CF substrate 154. As a result, light, passing through the connecting section can be prevented from being refracted, reflected or scattered, thereby achieving unnoticeable joints.

On the entire outer surface of the reinforcing substrate 157, a polarizing plate (polarizing element) 159 is formed. On the entire outer surface of the liquid crystal panels 152, a polarizing plate (polarizing elements) 160 is formed. The respective polarizing axes of the polarizing plates 159 and 160 intersect at right angles.

On the outer surface of the polarizing plate 160, i.e., on the rear surface of the liquid crystal display device 151 (lower side of FIG. 16), a back light composed of, for example, a cold cathode tube (not shown) is formed. A driver (not shown) which controls an image signal is connected to the liquid crystal panels 152. The viewer can see the image information as input into the liquid crystal panels 152 by modulating the light from the back light in accordance with the image data as input.

Next, the method of manufacturing the liquid crystal display device 151 will be explained. FIG. 17(a) through FIG. 17(c) and FIG. 18(a) through FIG. 18(e) are cross-sectional views showing the processes of manufacturing the liquid crystal display device 151.

First, as shown in FIG. 17(a), a shielding members 161a is formed at a central portion with a predetermined width in a lengthwise direction of the cut surface on the connecting side of the liquid crystal panels 152. Next, as shown in FIG. 17(b), the liquid crystal panels 152 are connected in such a manner that respective shielding members 161a contact one another. Here, the shielding members 161a are connected so as to form a shielding film 161. Next, in the state where the liquid crystal panels 152 are connected via the shielding film 161 as shown in FIG. 17(b), and as shown in FIG. 18(a), a bonding material 158 having a viscosity in a range of from 100 to 1000 cP is injected in the spacing formed between the liquid crystal panels 152 so as to connect them. Thereafter, as shown in FIG. 18(b), the bonding material 158 is applied on the entire surface of the substrates of the liquid crystal panels 152.

Next, as shown in FIG. 18(c), the reinforcing substrate 157 and the liquid crystal panels 152 are connected via the bonding material 158. Here, the reinforcing substrate 157 is connected to the liquid crystal panels 152 gradually from one side so as not to enclose foams in the bonding material 158.

Thereafter, as shown in FIG. 18(d), the excessive bonding material 158a as being overflown from the spacing between the liquid crystal panels 152 and the reinforcing substrate is removed. Thereafter, as shown in FIG. 18(e), an ultraviolet ray is projected to the bonding material 158 from the side of the rear surface of the reinforcing substrate 157 so as to harden the bonding material 158.

However, when adopting the described techniques, the following problems ① and ② would arise.

① In the conventional arrangement, in order to uniformly connect the liquid crystal panels 152 and the reinforcing substrate 157 so as not to enclose foams therein, overflow of the bonding material 158 from the space between the liquid crystal panels 152 and the reinforcing substrate 157 is required. Therefore, a large amount of the bonding material 158 is required to connect the liquid crystal panels 152 and the reinforcing substrate 157. In this case, the amount of the bonding material 158 to be hardened is around $\frac{1}{10}$ of the bonding material 158. In other words, the amount of bonding material 158a which is wasted is approximately $\frac{9}{10}$ of the total amount of bonding material 158.

Therefore, in the conventional technique, a substantial amount of bonding material 158 is wasted. This increases manufacturing cost thereby resulting in an increase in the wholesale and retail cost of the liquid crystal display device 151. ② In the process of manufacturing the liquid crystal display device 151, an excessive amount of the bonding material 158a overflows from the peripheral portion of the space between the liquid crystal panels 152 and the reinforcing substrate 157 each time a pair of liquid crystal panels 152 is attached to a reinforcing substrate 157. Therefore, not only the process of removing the bonding material 158 as being overflow, but also the process of removing excessive bonding material 158a adhering the liquid crystal panels 152 and the reinforcing substrate 157, are required.

Accordingly, in the process of connecting a pair of liquid crystal panels, to a reinforcing substrate the process of removing the excessive bonding material adhering the liquid crystal panel and the process of removing the bonding material overflow at the peripheral portion of the bonding section are both required each time a multi-panel liquid crystal display device is manufactured. This significantly decreases the efficiency and speed of the manufacturing process, thereby resulting in poor mass production quantity operability. As this causes a problem of lowering the throughput in the manufacturing process of the liquid crystal panel, which results in poor mass production.

Additionally, since in the conventional arrangement the bonding material which connects the liquid crystal panels and the reinforcing substrate is exposed to the outside air at the peripheral portion of the bonding section, the desirable reliability of the bonding material cannot be obtained. overflow at the peripheral portion of the bonding section are both required each time a multi-panel liquid crystal display device is manufactured. This significantly decreases the efficiency and speed of the manufacturing process, thereby resulting in poor mass production quantity.

SUMMARY OF THE INVENTION

An object of the present invention is to provide a large screen liquid crystal display device which prevents a bonding material hardening inferior and a display inferior in a display area due to the bonding material.

In order to achieve the above object, a method of manufacturing a multi-panel liquid crystal display device of the present invention prepared by connecting a liquid crystal multi-panel having a plurality of display surfaces to a reinforcing substrate is characterized by comprising the steps of:

(a) forming a pattern of a seal material on at least either one of a surface of the liquid crystal multi-panel and a surface of the reinforcing substrate;

(b) connecting the liquid crystal multi-panel and the reinforcing substrate via the seal material;

(c) injecting a bonding material into a spacing formed by the liquid crystal multi-panel, the reinforcing substrate and the seal material; and (d) hardening the bonding material.

According to the described method of manufacturing a multi-panel liquid crystal display device, the plurality of liquid crystal panels are connected side to side, and, for example, after forming the protrusions and recessions on the surface of the reinforcing substrate on the opposite side of the plurality of liquid crystal panels, the reinforcing substrate and the plurality of liquid crystal panels are connected via the bonding material. Here, the seal material is provided so as to surround the display area of the plurality of liquid crystal panels, thus forming a spacing between the reinforcing substrate and the plurality of liquid crystal panels. Thereafter, the bonding material is filled into the spacing through the bonding material injection hole; however, as the bonding material is blocked by the seal material, the bonding material can be prevented from being overflown.

Namely, according to the described arrangement, since the bonding material is filled into the spacing after connecting the reinforcing substrate to the plurality of liquid crystal panels, the amount of use of the bonding material can be minimized. As described, the problem of wasting bonding material that has to the outside or from being refined can be prevented. Therefore, the amount of use of the bonding material can be minimized, thereby avoiding a problem of an increase in the manufacturing cost.

As described, since excessive bonding material can be prevented from being overflowing to the outside, overflow process of removing the bonding material and improved process of removing the excessive bonding material adhering to the liquid crystal panel or the reinforcing substrate can be eliminated. Therefore, the described method offers an improved operability, the throughput in the manufacturing process. The method is also suited for mass production.

Additionally, as the protrusions and recessions are formed either on the surface of the reinforcing substrate, or the surface of the liquid crystal multi-panel, the bonding material can be filled into the spacing of the protrusions and recessions, and into the entire spacing with ease. As a result, it is no longer necessary to place the space holding member such as spacer, etc., into the spacing so as to prevent the reinforcing substrate from partially contacting the plurality of liquid crystal panels. Therefore, an improved display quality can be maintained without placing the space holding member in the display area.

In order to achieve the above object, a multi-panel liquid crystal display device of the present invention is characterized by including:

a liquid crystal multi-panel having a plurality of display surfaces;

a reinforcing substrate to be connected to the liquid crystal multi-panel;

a bonding material for connecting the liquid crystal multi-panel and the reinforcing substrate; and a bonding material seal material formed so as to surround a periphery of a bonding layer made of the bonding material.

According to the described arrangement, the bonding material for bonding the liquid crystal multi-panel and the reinforcing substrate can be prevented from being exposed to an outside air by the seal material. As a result, the liquid crystal multi-panel and the reinforcing substrate can be connected together with precision. By adopting the liquid crystal cell forming seal material for sealing the liquid crystal between the substrates (such as the thermosetting or ultraviolet ray setting seal material). Thus, a common material can be used for both seal materials, and the multi-panel liquid crystal display device can be realized at low cost.

For a fuller understanding of the nature and advantages of the invention, reference should be made to the ensuing detailed description taken in conjunction with the accompanying drawings.

BRIEF DESCRIPTION OF THE DRAWINGS

FIG. 8(a) is a cross-sectional view of the multi-panel liquid crystal display device;

FIG. 8(b) is an enlarged cross-sectional view of the connecting section between the liquid crystal panels;

DESCRIPTION OF THE EMBODIMENTS

[EMBODIMENT 1]

Figure 2:
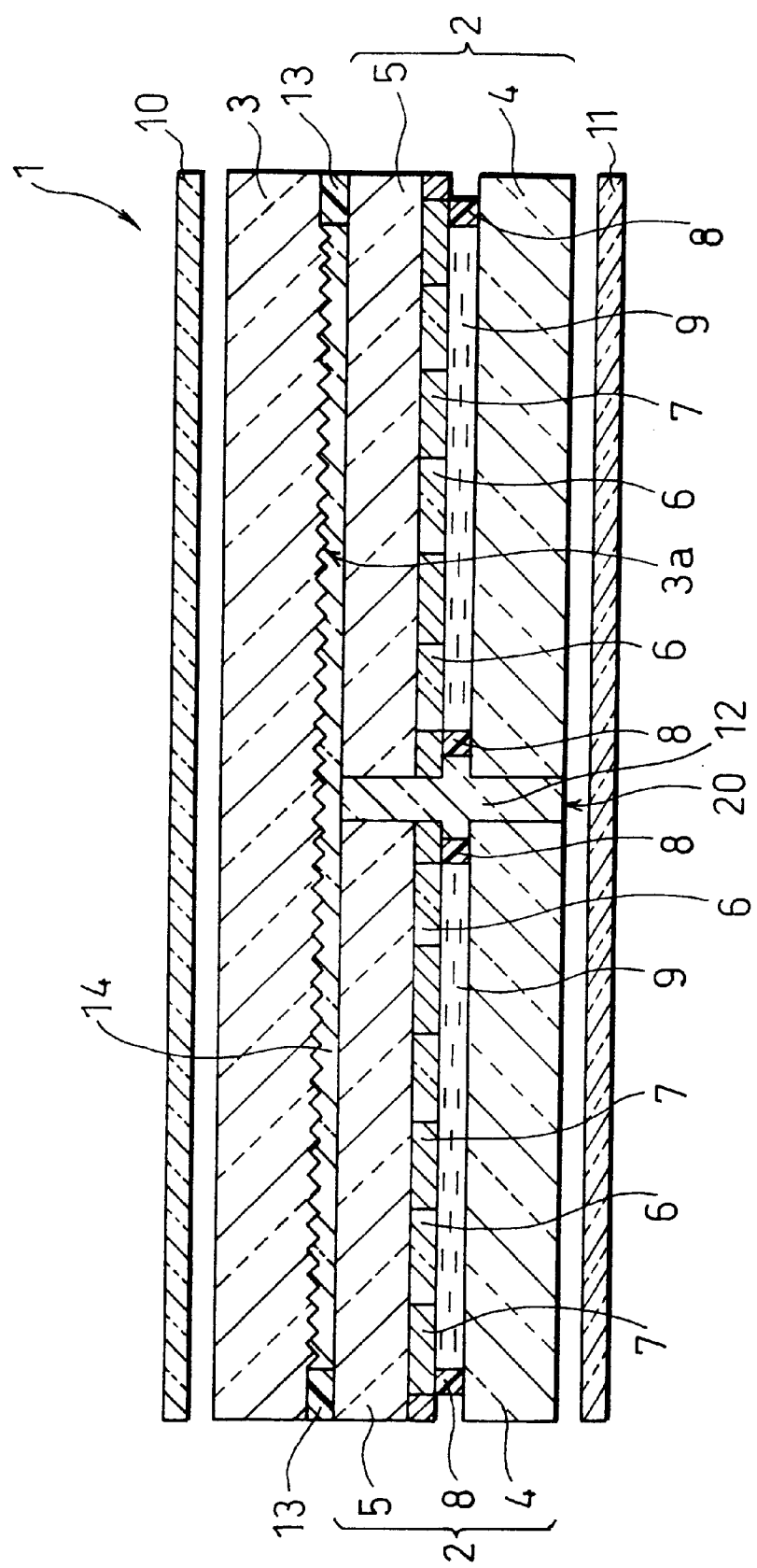
FIG. 2 is a cross-sectional view showing an example of the structure of the liquid crystal display device.

The following descriptions will explain one embodiment of the present invention in reference figures. In the present embodiment, a direct-sight-type liquid crystal display device 1 shown in FIG. 2 is adopted as an example of a liquid crystal display device composed of a plurality of liquid crystal panels. The liquid crystal display device 1 includes a plurality of active matrix liquid crystal panels 2 which constitute a liquid crystal multi-panel. For simplification, explanations will be given through the example where the liquid crystal display device 1 has two active matrix liquid crystal panels 2. The liquid crystal panels 2 generally have thin film transistors (hereinafter referred to as TFTs) as active elements; however, other active elements such as MIM (Metal Insulator Metal) elements may be equally adopted.

Figure 15:
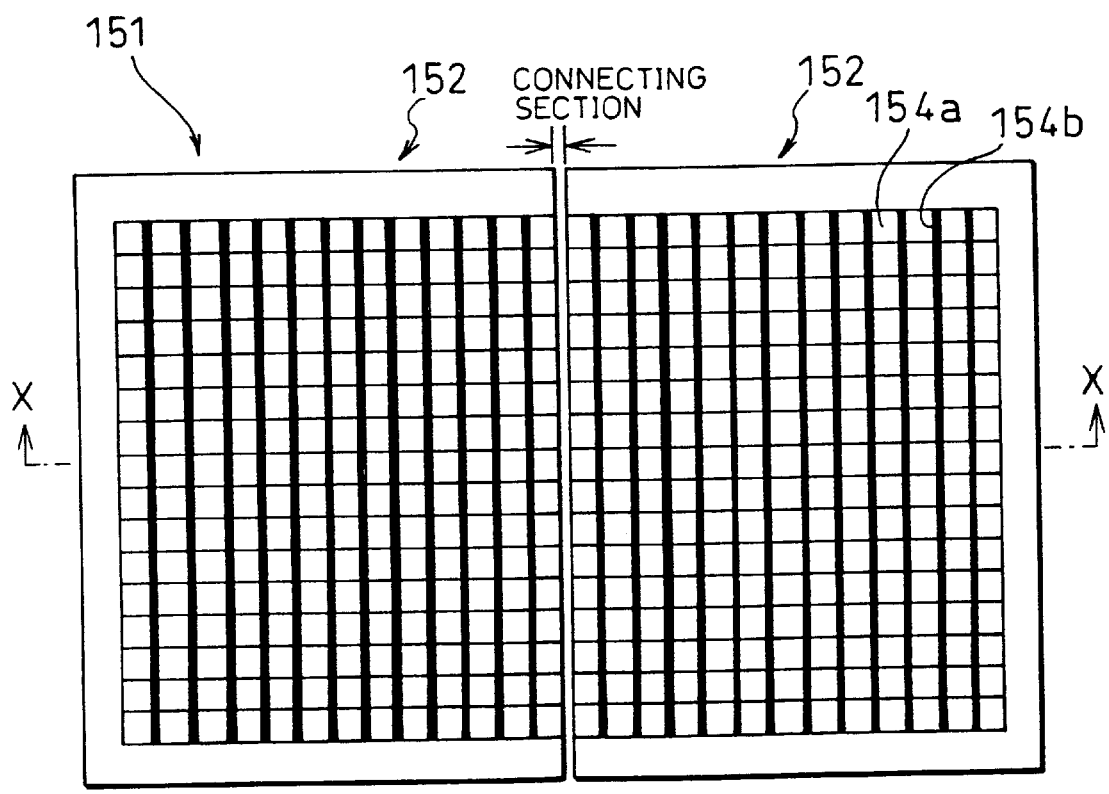
FIG. 15 is a plan view schematically showing a structure of a conventional multi-panel liquid crystal display device.
Figure 16:
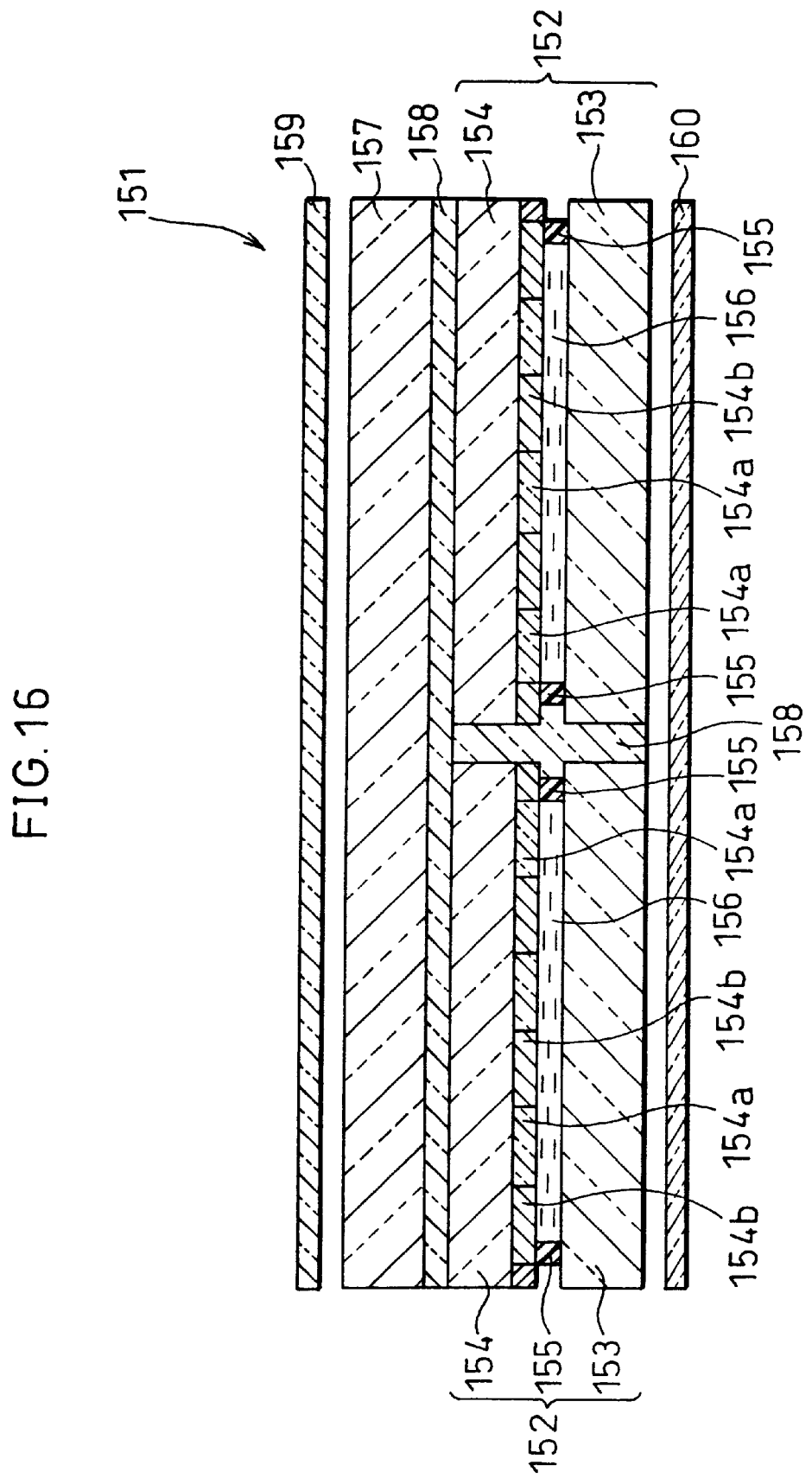
FIG. 16 is a cross-sectional view schematically showing the conventional multi-panel liquid crystal display device of FIG. 15 taken along lines X—X.
Figure 17A:
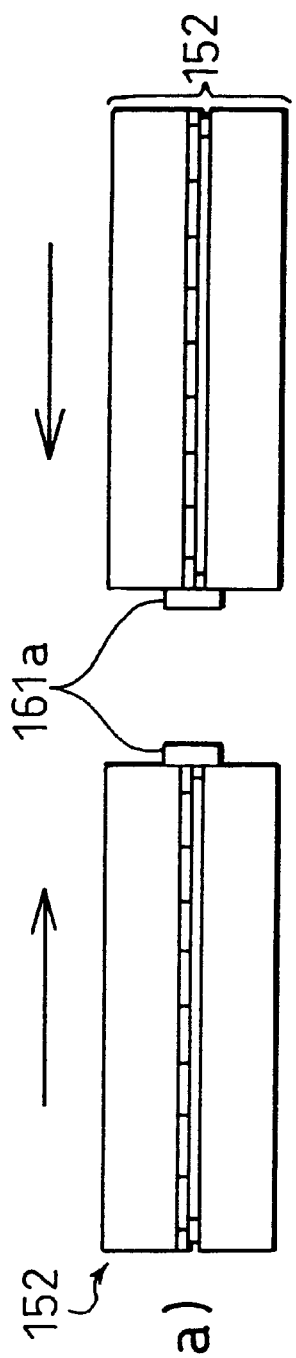
FIG. 17(a) through FIG. 17(c) are explanatory views respectively showing manufacturing processes of the conventional multi-panel liquid crystal display device.
Figure 17B:
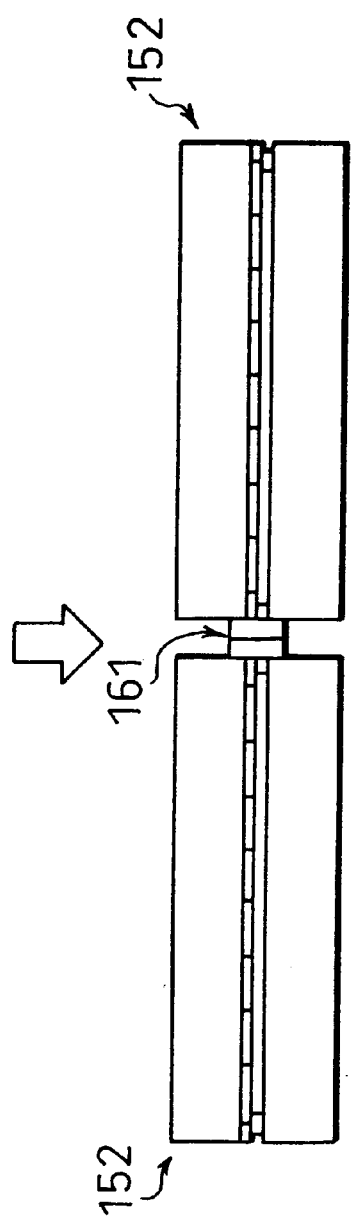
Figure 17C:
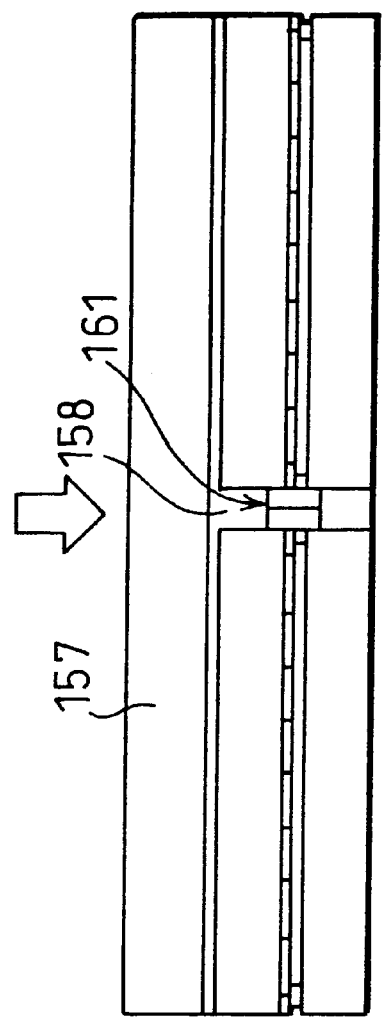
Figure 18A:
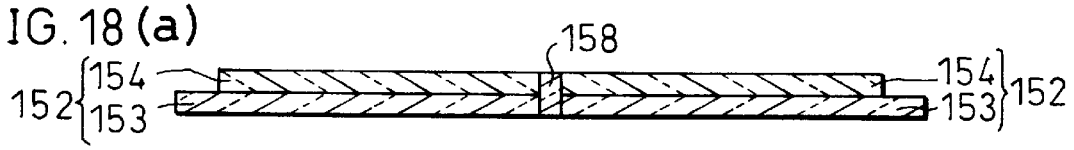
FIG. 18(a) through FIG. 18(e) are cross-sectional views respectively showing the manufacturing processes of the conventional liquid crystal display device.
Figure 18B:
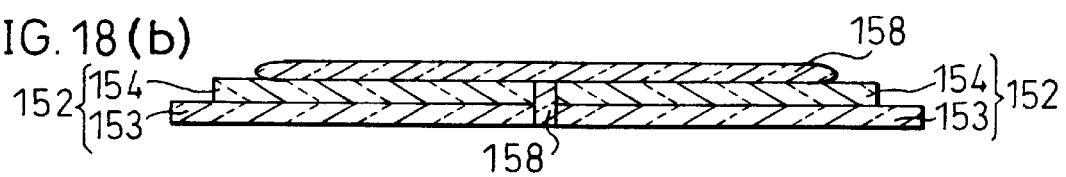
Figure 18C:
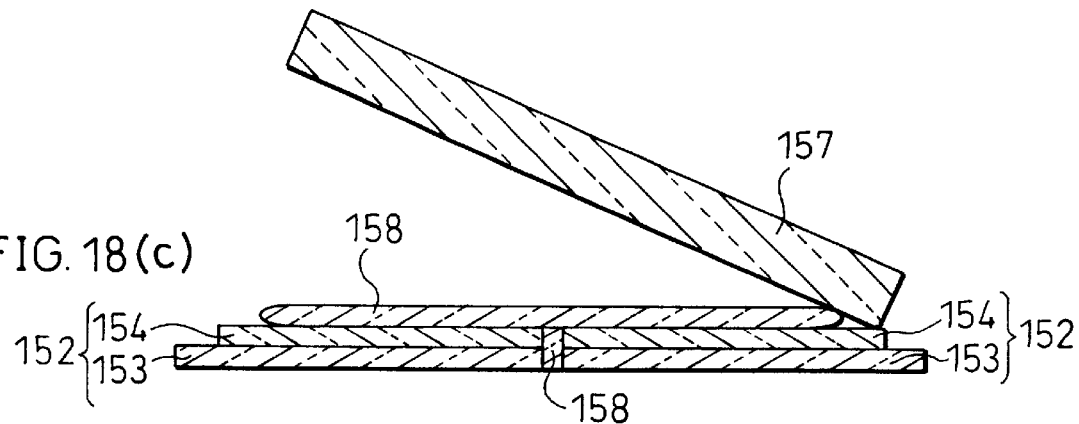
Figure 18D:
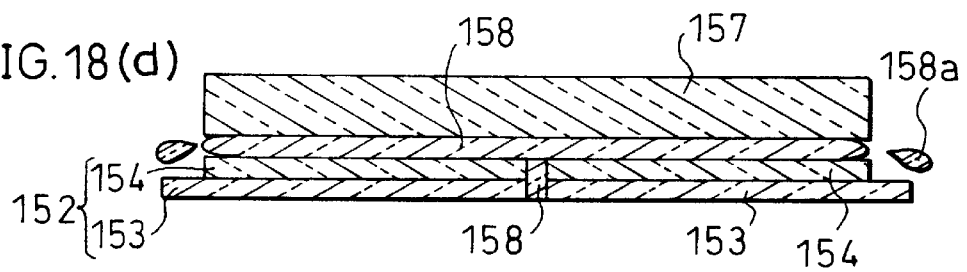
Figure 18E:
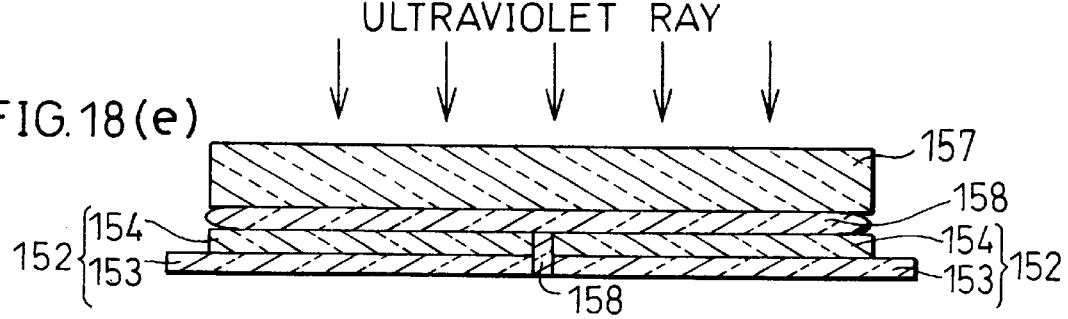

The liquid crystal panels 2 are connected side-to-side by a bonding material 12 (to be described later) serving as a refraction factor adjusting material. The liquid crystal panels 2 are connected to a large reinforcing substrate 3 via a seal material 13 and a bonding material 14 to be described later. Namely, the reinforcing substrate 3 is connected to the liquid crystal panels 2 so that they can be connected side-to-side on the same plane. The respective structures of pixels on these two liquid crystal panels 2 connected side-to-side are the same as those of the conventional arrangement shown in FIG. 15. The reinforcing substrate 3 will be described in detail later.

The liquid crystal panel 2 includes a TFT substrate 4 and a CF substrate 5. The TFT substrate 4 and the CF substrate 5 are transparent glass substrates. In the present embodiment, barium borosilicate glass 7059 available from Corning Co. (product name) is adopted for the glass substrate. On the TFT substrate 4, formed are thin film transistors (not shown) in a matrix. On the CF substrate 5, color filters 6 are formed in a matrix. As a result, the liquid crystal panel 2 is formed as an active matrix color liquid crystal panel. On the CF substrate 5, a black matrix 7 for separating each pixel is formed.

The TFT substrate 4 and the CF substrate 5 are connected via a seal section 8 formed along the respective peripheral portions in such a manner that pixel electrodes formed on the TFT substrate 4 and common electrodes formed on the CF substrate 5 face each other. Further, a liquid crystal 9 is sealed in a spacing formed between the TFT substrate 4 and the CF substrate 5.

A polarizing plate (polarizing element) 10 is formed substantially on an entire outer surface of the reinforcing substrate 3. Further, a polarizing plate (polarizing element) 11 is formed substantially on an entire outer surface of the liquid crystal panels 2. Here, respective polarizing axes of the polarizing plates 10 and 11 intersect at right angles. As a result, in the connecting section 20 between the liquid crystal panels 2, even if light from the back light (to be described later) leaks, as the polarizing plates 10 and 11 are in a cross-nicol state, the connecting section 20 shows black color and is difficult to see.

On the outer surface of the polarizing plate 11, i.e., on the rear surface (lower part in FIG. 2) of the liquid crystal display device 1, a back light made of a cold cathode tube (not shown) is formed. To the liquid crystal panels 2, a driver (not shown) for controlling an image signal is connected. The liquid crystal panels 2 are arranged such that the viewer can observe the image information as input in the liquid crystal panels 2 by modulating light from the back light according to the image data.

For the bonding material 12, for example, a transparent ultraviolet-ray-setting bonding material which is accelerated to be hardened with an application of an ultraviolet ray without requiring a heat treatment, and which shows low birefringence may be adopted. For the ultraviolet-ray-setting bonding material 12, it is suitable to adopt acrylic ultraviolet-ray-setting resin, etc., whose polymerization is accelerated as its double bond cleaves.

The bonding material 12 has the same refractive factors as two glass substrates which constitute the TFT substrate 4 and the CF substrate 5. Namely, assumed that the refractive factor of the two glass substrates be n, then the refractive factor of the bonding material 12 is given as n±0.01 n. As described, like the present embodiment, in the case of adopting barium borosilicate glass 7059 available from Corning Co. (product name) for the two glass substrates, it is preferable to adopt the bonding material 12 having a refractive factor of 1.53. By adopting the described bonding material 12, the light passing through the connecting section 20 can be prevented from being refracted, reflected or dispersed due to the protrusions and recessions formed on the cut surface of the substrate. As a result, the connecting section becomes less noticeable, and improved display characteristics of the display device can be achieved.

For the seal material 13, an ultraviolet-ray-setting seal material, a thermosetting seal material, a two-pack type epoxy seal material, etc., may be adopted. In order to connect the liquid crystal panels 2 to the reinforcing substrate 3, the seal material 13 is formed so as to surround the area corresponding to the display areas (display surfaces) of the liquid crystal panels 2.

For the bonding material 14, for example, the ultraviolet-ray-setting bonding material may be adopted. The bonding material 14 has the same refractive factor as two glass substrates which constitute the TFT substrate 4 and the CF substrate 5 like the bonding material 12.

Next, the reinforcing substrate 3 adopted in the present embodiment will be explained.

Figure 3A:
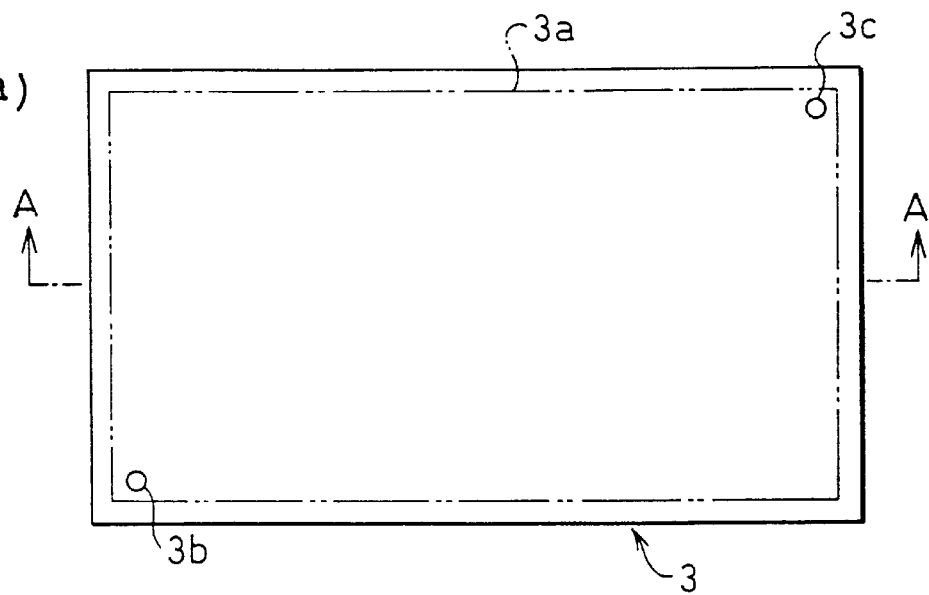
FIG. 3(a) is a plan view showing a reinforcing substrate having protrusions and recessions formed on the surface thereof by a sandblasting method.
Figure 3B:
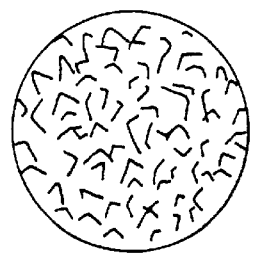
FIG. 3(b) is an enlarged plan view of the protrusions and recessions.
Figure 3C:
FIG. 3(c) is a cross-sectional view of FIG. 3(a) taken along lines A—A.

In the present embodiment, the reinforcing substrate 3 has a diagonal of 28 inch (442 mm×563 mm) which is constituted by the glass substrate having substantially the same coefficient of thermal expansion as that of the liquid crystal panels 2. As shown in FIG. 3(*a*) through FIG. 3(*c*) and FIG. 4(*a*) through FIG. 4(*c*), on the reinforcing substrate 3, protrusions and recessions 3*a* are formed so as to face the display areas of the liquid crystal panels 2. The protrusions and recessions 3*a* are formed, for example, by the sandblasting method or the screen printing method. FIG. 3(*a*) shows a plan view of the reinforcing substrate 3 whereon the protrusions and recessions 3*a* are formed by the sandblasting method, and FIG. 4(*a*) is a plan view of the reinforcing substrate 3 whereon the protrusions and recessions 3*a* are formed by the screen printing method.

In the sandblasting method, a particle alumina abrasive material is sprayed to make the surface coarse. In practice, the alumina abrasive material is sprayed on the surface of the reinforcing substrate 3 using a sandblasting machine (available from Fuji Seisakusho). As a result, as shown in FIG. 3(*b*) that is an enlarged view of the protrusions and recessions 3*a* on the surface of the substrate of FIG. 3(*a*) and FIG. 3(*c*) that is a cross-sectional view of the protrusions and recessions taken along lines A—A of FIG. 3(*a*), the protrusions and recessions 3*a* can be formed so as to make the surface of the reinforcing substrate 3 coarse with ease.

Figure 4A:
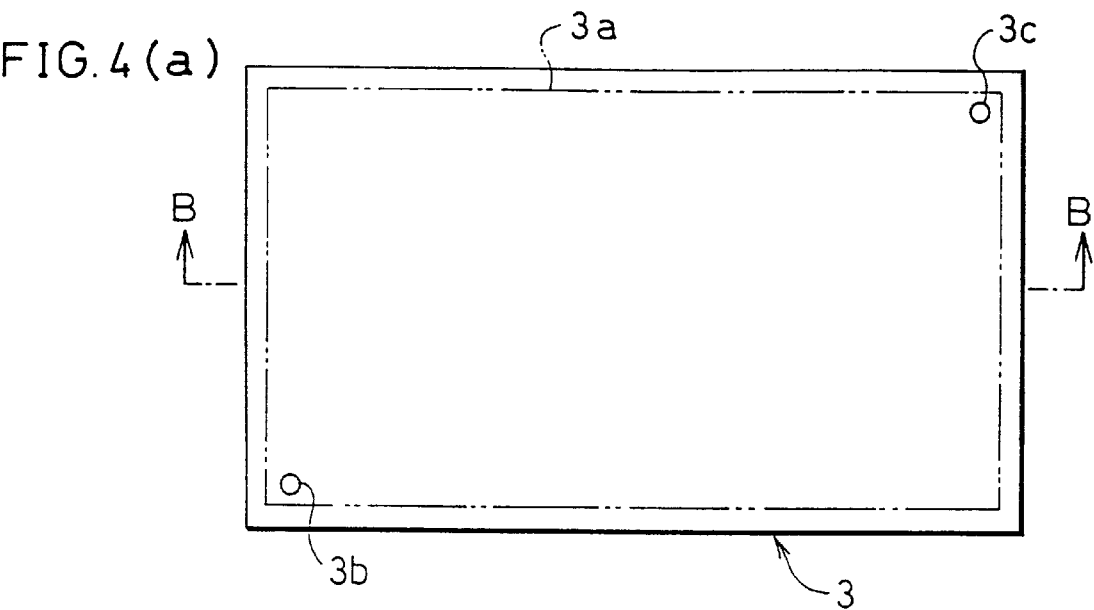
FIG. 4(a) is a plan view schematically showing a reinforcing substrate having protrusions and recessions formed on the surface thereof by a screen printing method.
Figure 4B:
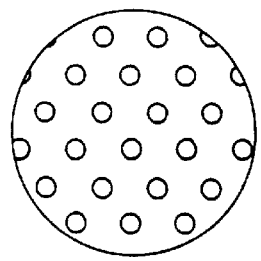
FIG. 4(b) is an enlarged plan view showing the protrusions and recessions.
Figure 4C:
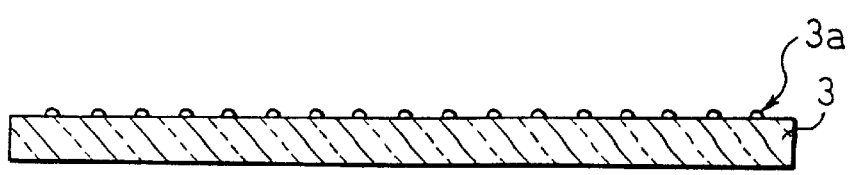
FIG. 4(c) is a cross-sectional view of FIG. 4(a) taken along lines B—B.

Alternately, the following method may be equally adopted. That is, a glass solder (flit glass) is screen-printed on the surface of the reinforcing substrate 3 in many dot pattern. In this case, also as shown in FIG. 4(*b*) that is an enlarged view of the protrusions and recessions 3*a* formed on the surface of the substrate of FIG. 4(*a*) and in FIG. 4(*c*) that is a cross-sectional view taken along lines B—B in FIG. 4(*a*), the protrusions and recessions 3*a* in the dot pattern are formed on the surface of the reinforcing substrate 3. Although the glass solder (flit glass) is required to be baked at around 450° C.; the reinforcing substrate 3 made of glass has sufficient resistance to heat.

In the present embodiment, the reinforcing substrate 3 has an equivalent refraction factor as the bonding material 14. As a result, adverse effects of dispersion or refraction of light at the protrusions and recessions 3a formed on the surface of the reinforcing substrate 3 can be eliminated, thereby preventing adverse effects on the display performances.

On the reinforcing substrate 3, formed are an evacuation hole 3b for evacuating a space formed between the reinforcing substrate 3 and the liquid crystal panels 2 and a bonding material injection hole 3c for injecting the bonding material 14 into the spacing. The evacuation hole 3b and the bonding material injection hole 3c are connected via a predetermined tube in the pressure bonding material injection device adopted in the present embodiment.

Figure 5:
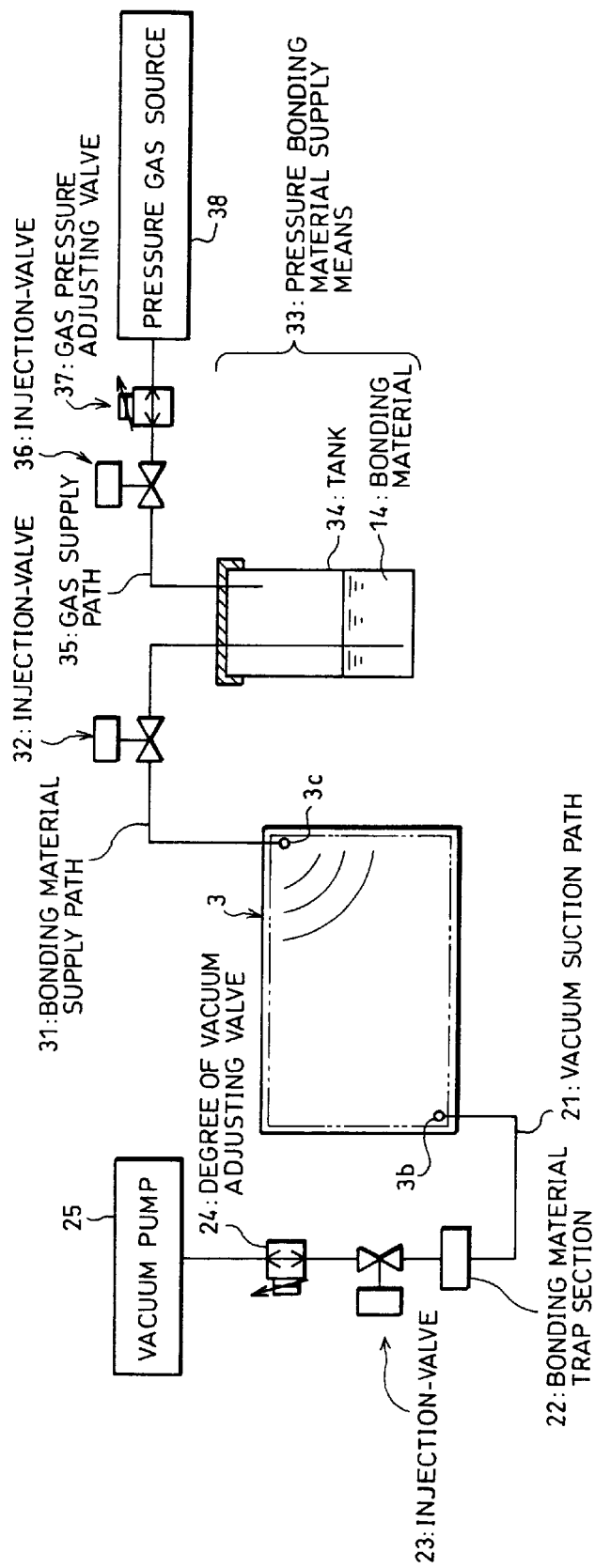
FIG. 5 is an explanatory view of a system structure of pressure bonding material injector adopted when manufacturing the liquid crystal display device.

Namely, in the pressure bonding material injection device shown in FIG. 5, the evacuation hole 3b in the reinforcing substrate 3 is connected to a vacuum suction path 21 constituted by a tube. The vacuum suction path 21 is connected to a vacuum pump 25 via a bonding material trap section 22, an injection-valve 23 and a degree of vacuum adjusting valve 24.

The bonding material trap section 22 is provided for preventing the bonding material 14 from contacting the vacuum pump 25 when sucking not only air but also the bonding material 14. The injection-valve 23 is a valve for starting or stopping the evacuation upon completion of the evacuation, and the degree of vacuum adjusting valve 24 is the valve for adjusting the strength of the absorption. Namely, by adjusting the injection-valve 23 and the degree of vacuum adjusting valve 24, the air between the reinforcing substrate 3 and the liquid crystal panel 2 can be absorbed by the vacuum pump 25 properly.

On the other hand, the bonding material injection hole 3c in the reinforcing substrate 3 is connected to a bonding material supply path 3 made of a tube, etc. The bonding material supply path 31 is connected to a pressure bonding material supply means 33 via an injection-valve 32. The pressure bonding material supply means 33 is composed of the bonding material 14 and a tank 34 of a closed container to be filled with the bonding material 14. The injection-valve 32 is provided for adjusting a supply of the bonding material 14 into the spacing between the reinforcing substrate 3 and the liquid crystal panels 2.

The pressure bonding material supply means 33 is connected to a pressure gas source 38 via a gas supply path 35, an injection-valve 36 and a gas pressure adjusting valve 37. The gas supply path 35 is provided for supplying gas from the pressure gas source 38 to the inside of the tank 34 of the pressure bonding material supply means 33. The supply of the gas is adjusted by the injection-valve 36. The gas pressure adjusting valve 37 is provided for adjusting a pressure of gas to be supplied from the pressure gas source 38. Examples of suitable gas include an inactive gas such as dry nitrogen, etc. In this case, even if the bonding material 14 is volatile, the bonding material 14 can be injected into the spacing without changing its components.

According to the described arrangement, when supplying gas inside the tank 34 of the pressure bonding material supply means 33 from the pressure gas source 38, the pressure inside the tank 34 is raised. As a result, the bonding material 14 is pushed into the bonding material supply path 31. Then, the bonding material 14 is supplied into the spacing between the reinforcing substrate 3 and the liquid crystal panel 2 through the bonding material injection hole 3c.

The method of manufacturing the liquid crystal display device adopting the pressure bonding material injection device will be explained. FIG. 1(a) through FIG. 1(e) are explanatory views respectively showing manufacturing processes of the liquid crystal display device.

Figure 1A:
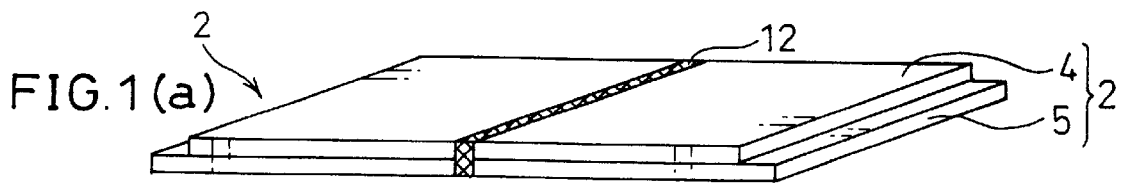
FIG. 1(a) is an explanatory view of a liquid crystal display device showing a manufacturing process in accordance with the present invention.

Firstly, as shown in FIG. 1(a), the adjoining two active matrix liquid crystal panels 2 are connected side to side by the bonding material 12. The bonding material 12 is, for example, made of an ultraviolet-ray-setting bonding material which has a refraction factor of 1.53 that is the same as those of the two glass substrates which constitute the TFT substrate 4 and the CF substrate 5.

Figure 1B:
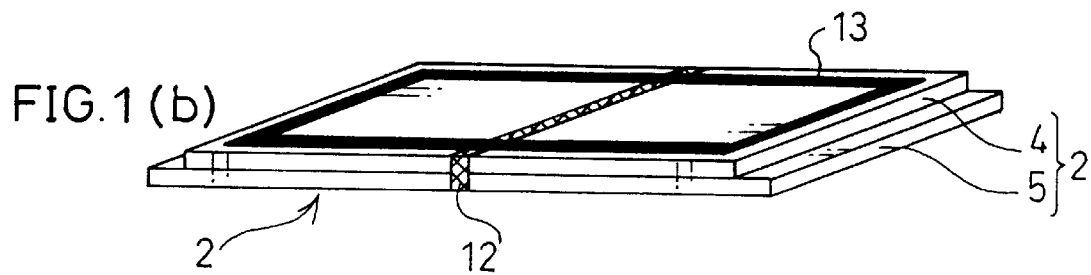
FIG. 1(b) is an explanatory view of the liquid crystal display device showing another manufacturing process in accordance with the present invention.

As shown in FIG. 1(b), the seal material 13 is formed in a flame pattern so as to surround the region corresponding to the display areas of the liquid crystal panels 2 which define a large screen. The seal material 13 is applied, for example, by the screen printing or the dispenser drawing method.

The seal material 13 may include a spacer for maintaining the spacing between the reinforcing substrate 3 and the liquid crystal panels 2. Here, as the seal material 13 is applied outside the display area of the liquid crystal panels 2, even if the seal material 13 including the spacer is adopted, a degrading of a display quality can be avoided.

Figure 1C:
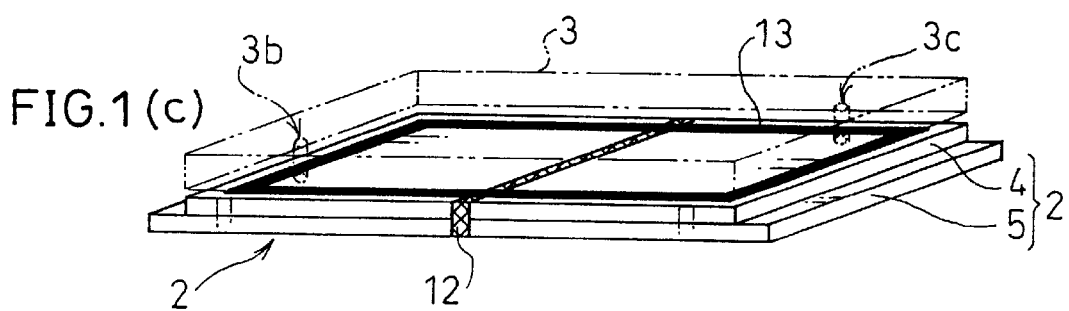
FIG. 1(c) is an explanatory view of the liquid crystal display device showing still another manufacturing process in accordance with the present invention.

Thereafter, the protrusions and recessions 3a (see FIG. 2) are formed on the surface of the reinforcing substrate 3 by the sandblasting method or the screen printing method, etc. Then, as shown in FIG. 1(c), the reinforcing substrate 3 is connected to the liquid crystal panels 2 to which the seal material 13 is applied in such a manner that the protrusions and recessions 3a of the reinforcing substrate 3 face the display areas of the liquid crystal panels 2.

Figure 1D:
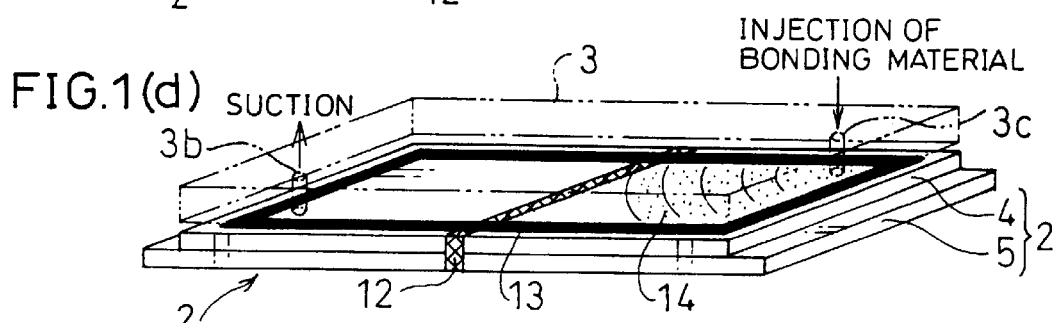
FIG. 1(d) is an explanatory view of the liquid crystal display device showing still another manufacturing process in accordance with the present invention.

Thereafter, as shown in FIG. 1(d), by the described pressure bonding material injection device, the bonding material 14 is injected through the bonding material injection hole 3c under an applied pressure by evacuating the spacing between the reinforcing substrate 3 and the liquid crystal panels 2 through the evacuation hole 3b.

The bonding material 14 is injected into the spacing between the reinforcing substrate 3 and the liquid crystal panel 2 generally by the vacuum suction without applying pressure to the bonding material 14. However, in the case of injecting the bonding material 14 containing a volatile solvent, or the bonding material 14 of a low boiling point, components of the bonding material 14 may change by the deaeration, and the refractive index or the bonding force of the bonding material 14 may change. In order to eliminate the described inconveniences, it is desirable to inject the bonding material 14 with a combined method of pressurizing the bonding material 14 and vacuum suction. By adopting the combined method, the bonding material 14 can be injected promptly and efficiently compared with the case of injecting the bonding material 14 only by vacuum suction.

Figure 1E:
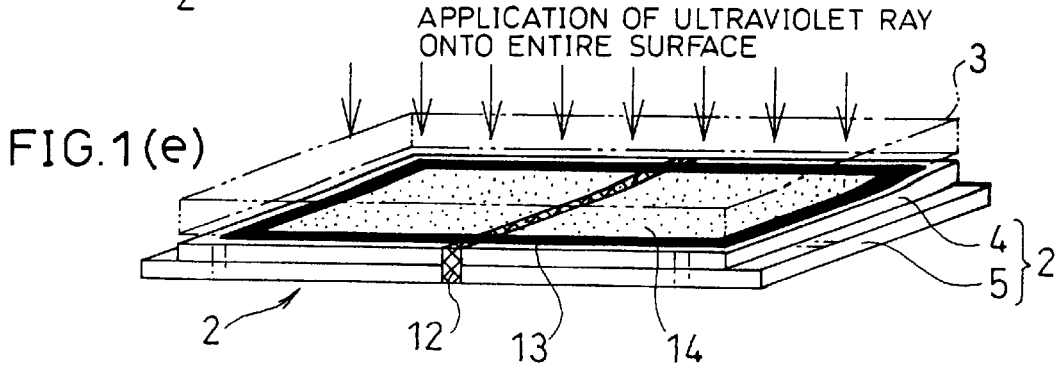
FIG. 1(e) is an explanatory view of the liquid crystal display device showing yet still another manufacturing process in accordance with the present invention.

Lastly, as shown in FIG. 1(e), an ultraviolet ray is projected on the front surface of the reinforcing substrate 3 to harden the bonding material 14. Here, if there arise large variations in the light intensity of the ultraviolet ray in the plane, variations in the hardening processes of the bonding material 14 as well as changes in optical characteristics such as birefringence, etc., at the portion subjected to the variations of hardening occur. Therefore, it is required to suppress the variations in the intensity of the irradiation of the ultraviolet ray within the range of ±10%.

As described, according to the manufacturing method of the present embodiment, after connecting the reinforcing substrate 3 and the liquid crystal panels 2, the bonding material 14 is injected into a spacing between the reinforcing substrate 3 and the liquid crystal panels 2 through a predetermined hole. Therefore, the problem associated with the conventional arrangement of overflowing of the excessive bonding material can be eliminated. This permits an amount of use of the bonding material 14 for connecting the reinforcing substrate 3 and the liquid crystal panels 2 to be reduced to the amount only sufficient for connecting them. As this eliminates the wasting of the bonding material 14, an increase in the manufacturing cost of the liquid crystal display device can be eliminated.

According to the described arrangement, as an excessive bonding material does not overflow outside, the process of removing overflowing bonding material, or the process of removing excessive bonding material adhering to the liquid crystal panels 2 and the reinforcing substrate 3 can be eliminated. As the described method offers an improved operation efficiency of manufacturing the device, the mass production of the device as well as a throughput can be improved.

Additionally, as the protrusions and recessions 3a are formed on the surface of the reinforcing substrate 3, when injecting the bonding material 14 into the spacing between the reinforcing substrate 3 and the liquid crystal panels 2, the bonding material 14 can be applied onto the entire surface of the display area of the liquid crystal panels 2 via the spacing of the protrusions and recessions 3a. As a result, the need of a spacer for maintaining the spacing between them can be eliminated, and a desirable display quality can be maintained.

Namely, in an absence of the protrusions and recessions 3a, when evacuating through the evacuation hole 3b of the reinforcing substrate 3, the reinforcing substrate 3 partially adheres to the liquid crystal panels 2, and the bonding material 14 cannot be applied uniformly onto the entire surface. In order to eliminate the described inconveniences, a method of forming the spacer between the substrates may be adopted. However, it is not desirable to form the spacer in the display area as a display quality is degraded.

In the present embodiment, the liquid crystal panels 2 and the reinforcing substrate 3 are connected by the bonding material 13 applied to the liquid crystal panels 2. However, it may be also arranged so as to connect the liquid crystal panels 2 and the reinforcing substrate 3 by applying the bonding material 13 to the side of the reinforcing substrate 3.

In the present embodiment, the protrusions and recessions 3a are formed on the surface facing the liquid crystal panels 2 of the reinforcing substrate; however, it may be also arranged so as to form the protrusions and recessions on the surface facing the reinforcing substrate 3 of the liquid crystal panels 2. Namely, the effect of the present embodiment can be achieved as long as the protrusions and recessions 3a are formed at least on either one of the surface of the liquid crystal panels 2 and/or a surface of the reinforcing substrate 3 which are placed so as to oppose each other.

In the present embodiment, the two types of the protrusions and recessions 3a are adopted, i.e., those which form a coarse surface or of the dot pattern. However, the protrusions and recessions 3a of the present embodiment are not limited to these shapes as long as the same effects as achieved from the present embodiment can be achieved. Similarly, the protrusions and recessions 3a may be formed by other method than the described sandblasting method and the screen printing method.

Further, explanations of the present embodiment have been given through the case of adopting the liquid crystal display device having the reinforcing substrate 3 formed on one surface of the liquid crystal panels 2. However, the present invention is also applicable to the arrangement where the reinforcing substrates 3 are formed on both surfaces of the liquid crystal panels 2. Additionally, the present invention is applicable to the multi-panel liquid crystal display device in which two or more liquid crystal panels are connected.

The described manufacturing method is applicable not only to the liquid crystal display device but also to the other display devices which include a large screen by connecting a plurality of flat panel displays such as PDPs (plasma display panel), FEDs (Field Emission Display), etc.

[EMBODIMENT 2]

The following descriptions will explain another embodiment of the present invention in reference to figures.

Figure 7:
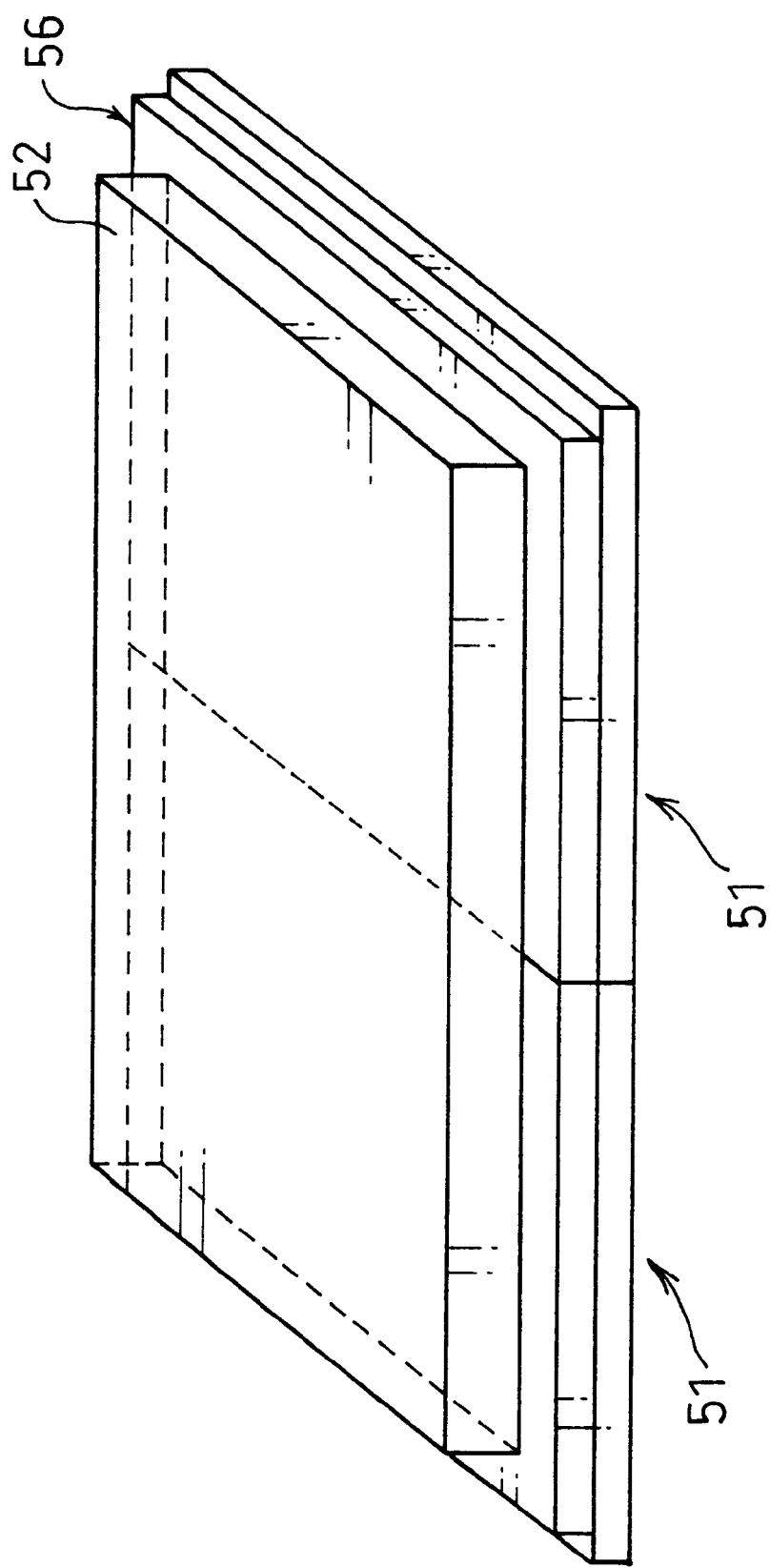
FIG. 7 is a perspective view showing a schematic structure of the multi-panel liquid crystal display device.

FIG. 7 is a perspective view showing a schematic structure of a multi-panel liquid crystal display device of the present embodiment. The multi-panel liquid crystal display device is arranged such that a plurality of liquid crystal panels 51 are formed on a plane at predetermined intervals to form a multi-panel 56 (liquid crystal multi-panel). The liquid crystal panels 51 are adjacently connected side to side using a bonding material, etc. Hereinafter, this side is referred to as a connecting side. The plurality of liquid crystal panels 51 which constitute the large liquid crystal panel are connected to a reinforcing substrate 52.

FIG. 8 (a) is a cross-sectional view of the multi-panel liquid crystal display device with respect to a cross-section vertical to the surface of the multi-panel 56 which forms a right angle with the connecting surface of the liquid crystal panels 51. The plurality of liquid crystal panels 51 are connected side to side. On one side of the multi-panel 56, formed is a seal pattern 53 of the seal material so as to surround image display areas. By the seal pattern 53, the multi-panel 56 and the reinforcing substrate 52 are connected via the seal pattern 53, and the bonding material 55 (bonding layer) is filled in the spacing formed by the seal pattern 53, the multi-panel and the reinforcing substrate 52.

In the present embodiment, the reinforcing substrate 52 may be formed on one side of the multi-panel 56. However, it may be also arranged such that the reinforcing substrates 52 are formed on front and rear surfaces of the multi-panel 56 so that the reinforcing substrates 52 sandwich the multi-panel 56.

FIG. 8(b) is an enlarged cross-sectional view of the connecting section of the adjoining liquid crystal panels 51. The liquid crystal panel 51 includes two glass substrates 69 and the liquid crystal layer 68 sandwiched between the glass substrates 69.

In this case, black resins 58 made of silicone having a predetermined width are formed so as to block the spacing between the liquid crystal panels 51. As a result, the light passing through the spacing between the liquid crystal panels 51 can be blocked, and a leakage of light through the spacing can be eliminated completely. As a result, a large panel of the liquid crystal panels 51 in which joints do not stand out can be realized.

The method of manufacturing the liquid crystal display device in accordance with the present embodiment will be explained in reference to FIG. 6(a) through FIG. 6(d).

As shown in FIG. 6(a), a plurality of liquid crystal panels 51 are placed at a predetermined interval between them so as to form a multi-panel 51, and the bonding material is filled in the spacing between them so as to connect the plurality of liquid crystal panels 51 side to side.

Next, as shown in FIG. 6(b), on the surface of the multi-panel 56, the seal pattern 53 of the seal material is formed so as to surround the image display areas of a plurality of display surfaces. As the method of forming the seal pattern 53, the screen printing method or the dispenser drawing method may be used. Examples of the seal material include an ultraviolet-setting resin, a thermosetting resin, a combination of thermosetting and ultraviolet-ray-setting resin, a two-pack type epoxy bonding material, etc. For the seal material for sealing the liquid crystal between the glass substrates, the same material as the seal material for use in forming a liquid crystal cell may be used.

In the present embodiment, the seal pattern 53 is formed on the surface of the multi-panel 56; however, it may be also arranged so as to form the seal pattern 53 on the surface of the reinforcing substrate 52, or on both the surface of the multi-panel 56 and the surface of the reinforcing substrate 52.

Additionally, as shown in FIG. 9(*a*) and FIG. 9(*b*), when forming the seal patterns 53, openings 54 are formed.

Figure 6:
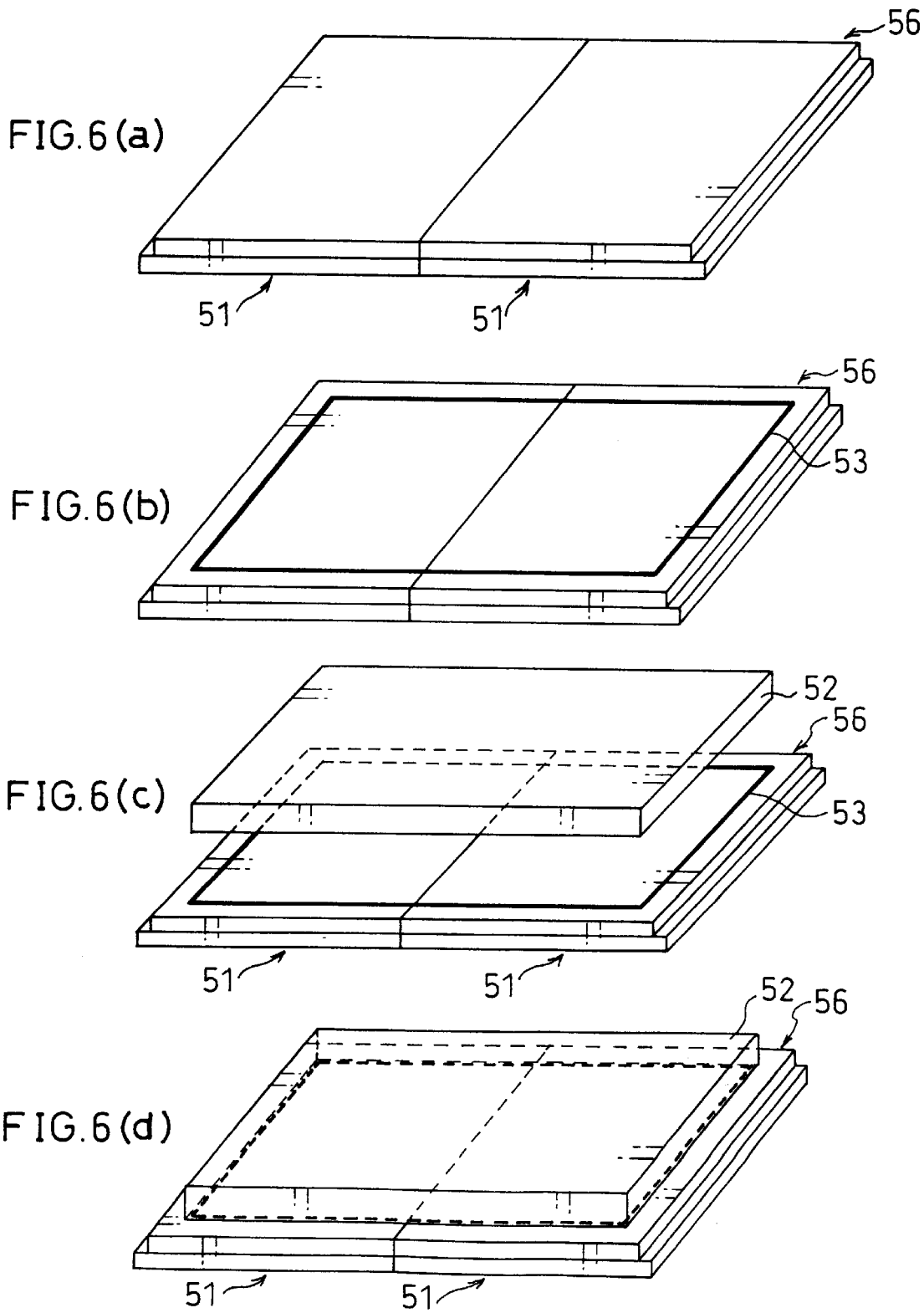
FIG. 6(a) is an explanatory view showing a main manufacturing process of a multi-panel liquid crystal display device in accordance with another embodiment of the present invention.
FIG. 6(b) is an explanatory view showing another essential manufacturing process of the liquid crystal display device.
FIG. 6(c) is an explanatory view showing still another manufacturing process of the liquid crystal display device.
FIG. 6(d) is an explanatory view showing yet still another manufacturing process of the liquid crystal display device.

Next, as shown in FIG. 6(*c*) and FIG. 6(*d*), the reinforcing substrate 52 having the same size as the multi-panel 56 is connected to the multi-panel 56 on which the seal patterns 53 are formed. After forming the seal patterns 53 on the multi-panel 56, the seal material is hardened by an appropriate method.

In this state, it is desirable to disperse the spacer between the multi-panel 56 and the reinforcing substrate 52 to ensure the spacing to be filled with the bonding material 55. Here, as the diameter of the spacer is too small, it is difficult to ensure the spacing. On the other hand, if it is too large, the transmittance is lowered. Accordingly, in order to smoothly carry out the filling of the bonding material 55, the diameter of the spacer is preferably formed in a range of from 20 to 200 μm, and more preferably in a range of from 30 to 150 μm. Next, the bonding material 55 is filled in the spacing between the multi-panel 56 and the reinforcing substrate 52. For the bonding material 55, it is desirable to adopt the bonding material having substantially the same refractive factor as the glass substrate 69 which constitutes the liquid crystal panel 51. For the glass substrate 69 of the liquid crystal panel 51, for example, a glass substrate available from the Coring Co. (product model: 7059) may be suitably used. In this case, it is desirable to use the bonding material having a refraction factor of 1.53. It is still more desirable to adopt an ultraviolet-ray-setting resin that can be hardened at high speed without requiring a heat treatment.

Then, the bonding material 55 is injected through at least one opening section(s) 54 formed at a predetermined part of the seal patterns 53. For the injection method, a vacuum injection method shown in FIG. 10(*a*) can be suitable used.

First, in the vacuum chamber, the multi-panel 56 and the reinforcing substrate 52 are connected via the seal patterns 53. Next, the opening section 54 is dipped into the bonding material 55 placed in the plate under the vacuum state of the spacing surrounded by the multi-panel 56, the reinforcing substrate 52 and the seal patterns 53. Thereafter, by raising the pressure in the chamber to the normal pressure, the bonding material 55 is injected into the spacing. Upon completion of the injection, the opening section 54 is sealed, for example, by a generally used bonding material.

Figure 10A:
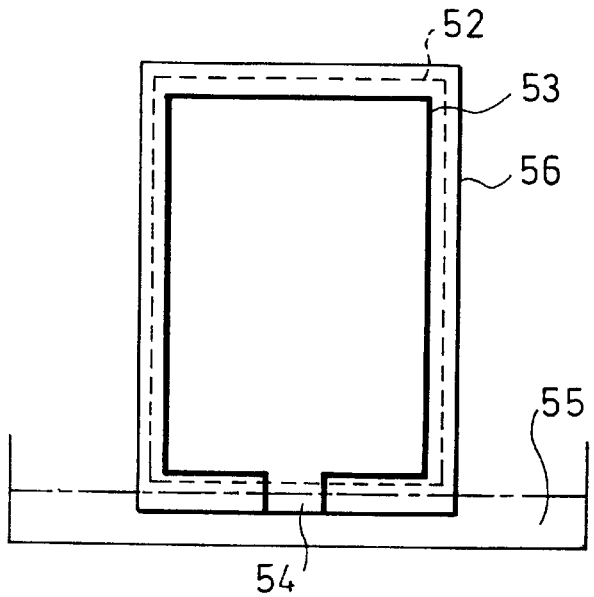
FIG. 10(a) is an explanatory view showing a process of injecting a bonding material in the case of adopting a deaeration injection method in the manufacturing process of the multi-panel liquid crystal display device.
Figure 10B:
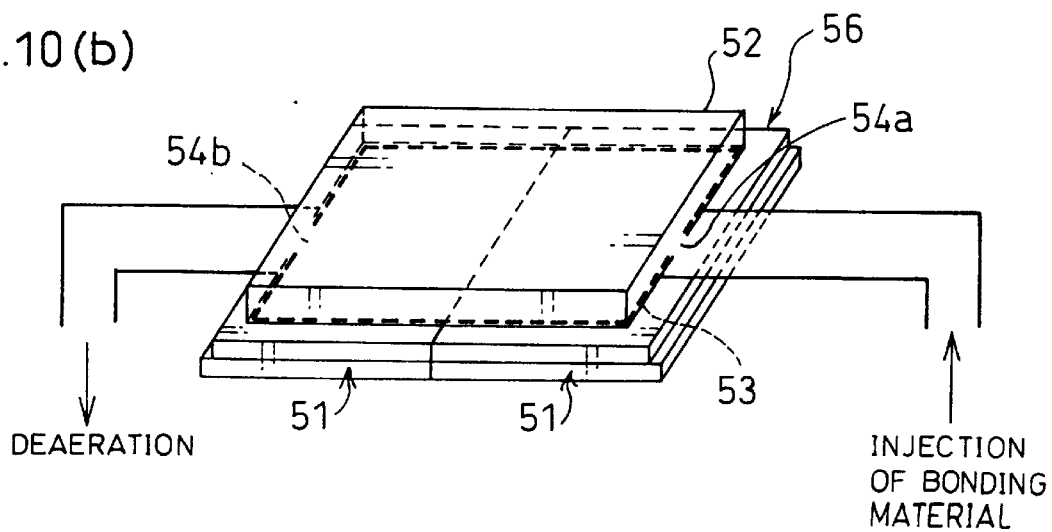
FIG. 10(b) is an explanatory view showing a process of injecting a bonding material in the case of adopting a pressure deaeration injection method in the manufacturing process of the multi-panel liquid crystal display device.

As shown in FIG. 10(*b*), a pressure deaeration injection method can be adopted as another example of the injection method. In this method, two opening sections 54*a* and 54*b* are formed in opposing directions of the seal patterns 53, and through the opening section 54*a*, the bonding material is injected, and through the opening section 54*b*, the spacing between the multi-panel 56 and the reinforcing substrate 52 is deaerated.

The pressure deaeration injection method may be performed in such a manner that not less than three opening sections are formed, and the bonding material is injected through at least one opening, and the spacing between the multi-panel 56 and the reinforcing substrate 52 is deaerated through at least one opening other than the described opening.

Next, the bonding material 55 as being injected is hardened. For the bonding material 55, in the case of adopting the ultraviolet-ray-setting bonding material, the ultraviolet ray is projected on the entire surface of the bonding material 55 so as to make the illuminance as uniform as possible.

By the described method, the multi-panel 56 and the reinforcing substrate 52 can be connected together without using the excessive bonding material. Additionally, as the bonding material does not overflow, the process of removing the bonding material, or the process of refining can be omitted. Furthermore, by adopting the vacuum injection method or the pressure deaeration injection method, the bonding material can be injected promptly for sure. Therefore, a quality product can be expected, and the time required for the production can be reduced. For the seal material for use in forming the seal patterns, it is effective to adopt the seal material for use in forming the liquid crystal cell for sealing the liquid crystal between the glass substrates, to reduce the manufacturing cost.

For the multi-panel liquid crystal display devices, various display modes adopting the liquid crystal material may be used such as TNs (Twisted Nematic), STNs (Super Twisted Nematic), FLCs (Ferroelectric Liquid Crystal), GH-LCs (Guest-Host Liquid Crystal) can be adopted. As the method of driving the liquid crystal display device, for example, a simple matrix driving, or an active matrix driving adopting the TFT and the MIM elements can be used.

The following descriptions will show detailed examples of manufacturing the described multi-panel liquid crystal display device; however, it should be noted here that the present invention is not limited to such preferred embodiment.

For the glass substrate 69, the liquid crystal panels 51 adopting the glass substrate 7059 (product name) available from the Corning Co., Ltd. are placed on a quartz setting plate (not shown) at a predetermined interval so as to form the multi-panel 56.

Then, a predetermined amount of the ultraviolet-ray-setting bonding material is filled in a spacing between the liquid crystal panels 51, and the liquid crystal panels 51 are connected. For the ultraviolet-ray-setting bonding material, for example, a Locktight 365 (product name) available from the Locktight Co., Ltd. may be used. The refraction factor of the Locktight is 1.53.

In the connected state of the liquid crystal panels 51, an ultraviolet ray having an intensity of 30 mW/cm$^2$ is projected for 10 minutes from at least one side of the liquid crystal panels 51, and the bonding material is hardened so as to steadily connect the two liquid crystal panels 51, thereby forming the multi- panel 56.

Before connecting the liquid crystal panels 51, as shown in FIG. 8(*b*), it is preferable to form black resins 58 having a predetermined width made of silicone in a lengthwise direction of the connecting side at a position corresponding to the liquid crystal layer 68.

Next, on one of the surfaces of the multi-panel 56, the seal patterns 53 are formed so as to surround the periphery of the image display areas. For the seal material, for example, Struct Bond XN-21S (product name) available from Mitsui Toatsu Chemicals, Inc. may be adopted.

In the seal material, a spacer may be mixed so as to maintain the spacing between the reinforcing substrate 52 and the multi-panel 56 is uniform. For the method of forming the seal patterns 53, a printing method adopting a screen printing, and a drawing method by the dispenser may be adopted.

Figure 9A:
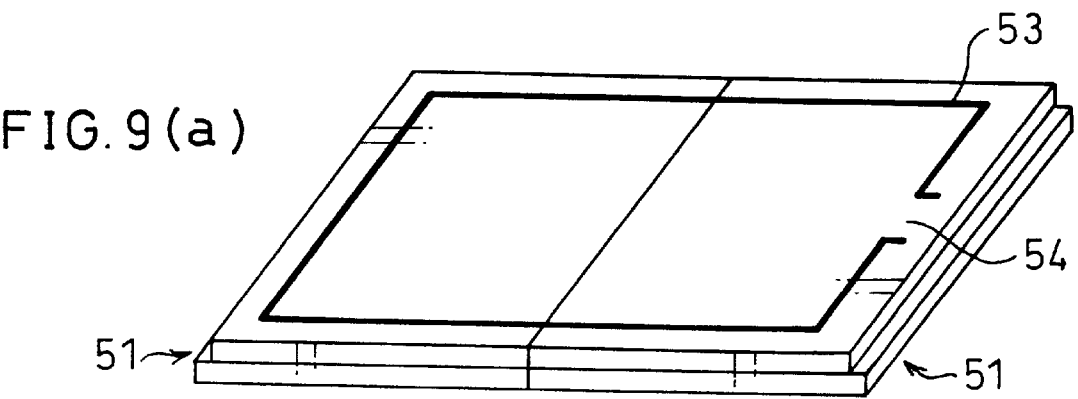
FIG. 9(a) is a perspective view showing an example of the seal pattern of the multi-panel liquid crystal display device.
Figure 9B:
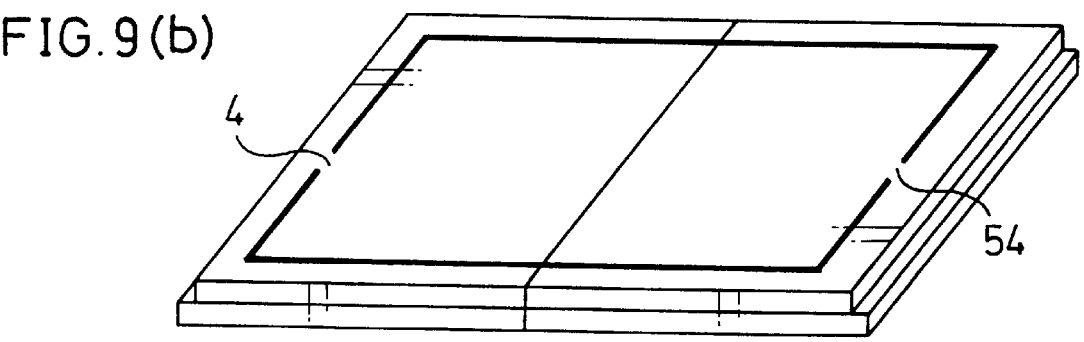
FIG. 9(b) is a perspective view showing another example of the shape of the seal pattern of the multi-panel liquid crystal display device.

As shown in FIG. 9(a) and FIG. 9(b), the opening section 54 is formed at least in one part of the seal patterns 53.

As described, the surface of the multi-panel 56 having formed thereon the seal patterns 53 and the glass reinforcing substrate 52 having a thickness of 3 mm are connected together. In this case, in order to maintain a predetermined spacing between the multi-panel 56 and the reinforcing substrate 52, spacers are dispersed. In this case, micropearl (product name) having a diameter of 100 μm available from Sekisui FC Co., Ltd. may be used. Thereafter, a heat treatment is applied for one hour at 170° C. to harden the seal material.

Then, the bonding material 55 is injected into the spacing formed by the reinforcing substrate 52, the multi-panel 56 and the seal patterns 53 thus formed. In this example, a Locktight 365 (product name) having a refraction factor of 1.53 available from Locktight Co., Ltd., is adopted for the bonding material 55.

For the method of injecting the bonding material 55, the described vacuum injection method or the pressure deaeration injection method may be used. Upon completing the injection of the bonding material 55, an ultraviolet ray having an illumination of 30 mW/cm$^2$ for 30 minutes using a high-pressure mercury lamp to harden the bonding material 55 filled in the spacing formed between the multi-panel 56, the reinforcing substrate 52 and the seal patterns 53.

As described, according to the structure of the present embodiment, by the effect of the seal patterns 53, the bonding material 55 filled in the spacing formed between the multi-panel 56 and the reinforcing substrate 52 is not exposed to the outside air. Therefore, a reliable state of the bonding material 55 can be maintained. As a result, a still steadily bonding state between the multi-panel 56 and the reinforcing substrate 52 can be ensured.

According to the manufacturing method of the present embodiment, as the bonding material 55 is injected after connecting the multi-panel 56 and the reinforcing substrate 52 via the seal patterns 53, the amount of use of the bonding material 55 can be reduced, and the manufacturing cost can be lowered.

Furthermore, when connecting the multi-panel 56 and the reinforcing substrate 52, by adopting the vacuum injection method or the pressure deaeration injection method, entering of foams into the spacing between the multi-panel 56 and the reinforcing substrate 52 can be surely prevented. As such vacuum injection method or the pressure deaeration injection method are known techniques, the injection line of the bonding material can be realized by applying the injection line of the liquid crystal. As a result, the multi-panel liquid crystal display device can be manufactured at low cost.

[EMBODIMENT 3]

The following descriptions will explain still another embodiment of the present invention in reference to figures. Here, members having the same functions as those of the aforementioned embodiments will be designated by the same reference numerals, and thus the descriptions thereof shall be omitted here.

The present embodiment differs from the second embodiment in that when connecting liquid crystal panels 51 so as to form a multi-panel 56 using the bonding material, the bonding material is injected without dropping it.

Figure 11A:
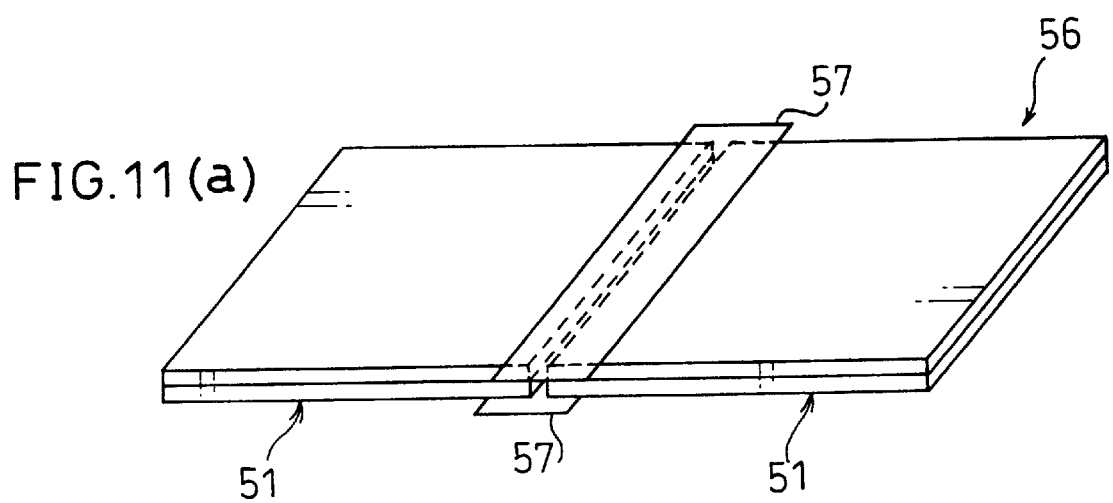
FIG. 11(a) is a perspective view showing one manufacturing process of the multi-panel liquid crystal display device in accordance with another embodiment of the present invention.
Figure 11B:
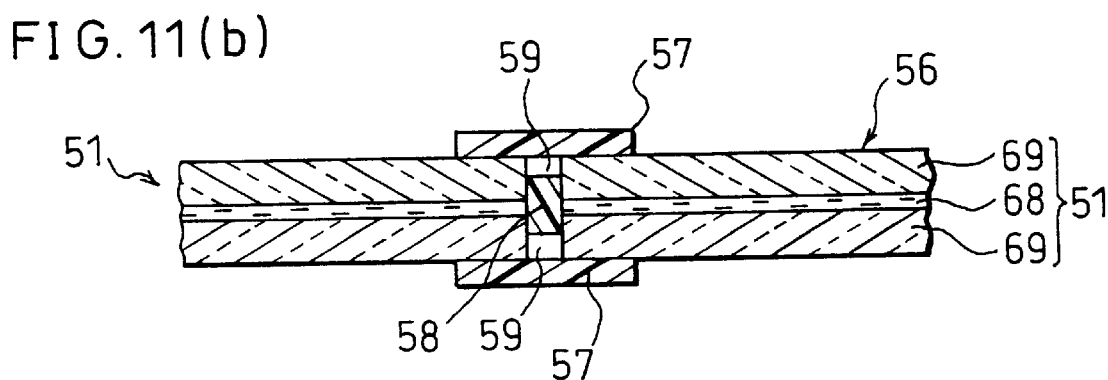
FIG. 11(b) is a cross-sectional view showing another manufacturing process of the liquid crystal display device.

FIG. 11(a) is a perspective view showing one process for connecting liquid crystal panels 51 side to side so as to form the multi-panel 56. FIG. 11(b) is an enlarged cross-sectional view showing the connecting section.

When preparing the multi-panel 56, first, liquid crystal panels 51 are placed at a predetermined interval. As shown in FIG. 11(b), it is preferable to form a black resin 58 having a predetermined width made of silicone in a lengthwise direction of the connecting side at position corresponding to the liquid crystal layer 68.

As shown in FIG. 11(a), a film 57 made of PET (Polyethylene telephthalate) is formed at the connecting section of the liquid crystal panels 51 so as to cover a space formed between the contacting sides of the liquid crystal panels 51. Then, a bonding material is injected into a spacing 59 formed between the film 57 and the connecting sides.

Figure 12:
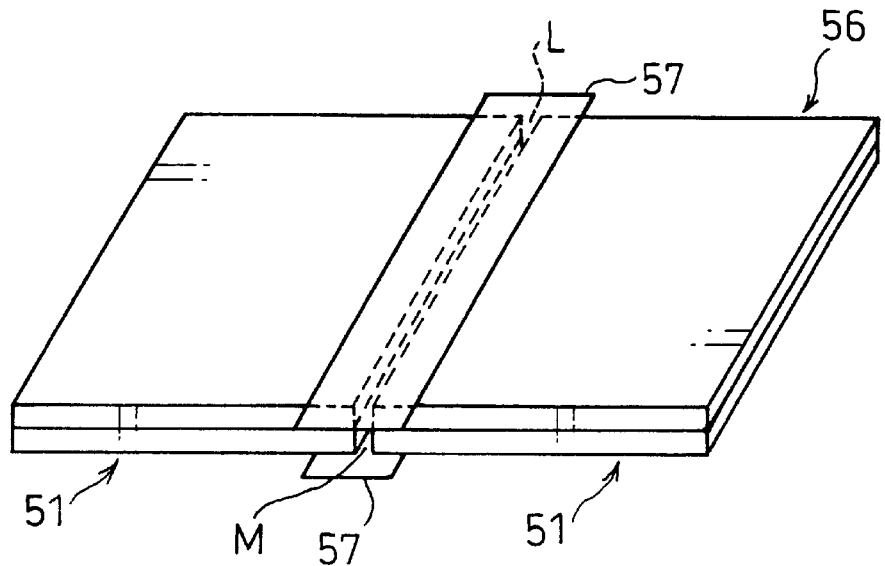
FIG. 12 is a perspective view showing a method of injecting a bonding material by the pressure deaeration injection method in the manufacturing process of the multi-panel liquid crystal display device.

When injecting the bonding material, it is suitable to adopt a pressure deaeration injection method or a vacuum injection method. As shown in FIG. 12, when injecting the bonding material into the spacing 59 by the pressure deaeration injection method through the opening section L, and the deaeration is performed from the other opening section M. As a result, the bonding material can be injected into the spacing 59 uniformly and effectively.

Figure 13:
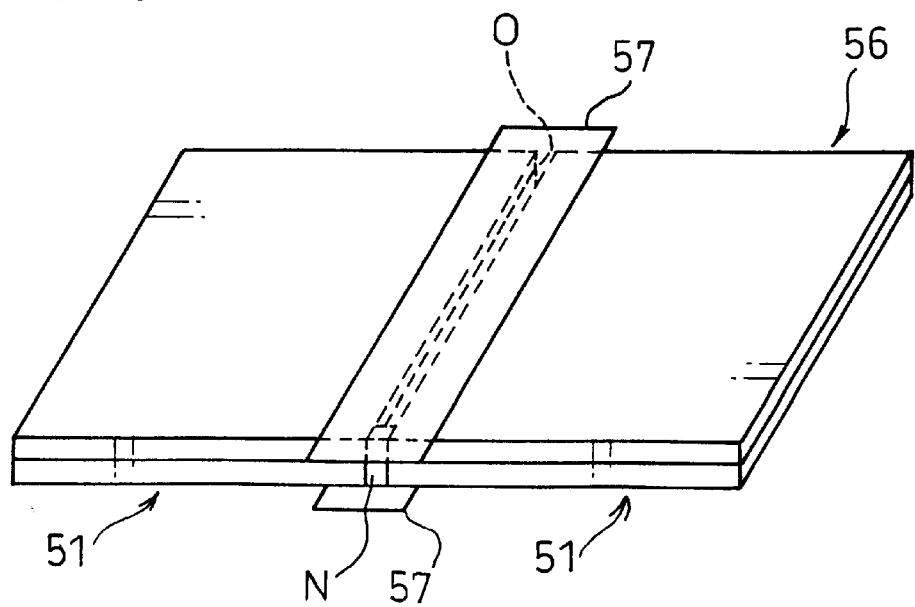
FIG. 13 is a perspective view showing a method of injecting a bonding material by the vacuum injection method in the manufacturing process of the multi-panel liquid crystal display device.

In the case of adopting the vacuum injection method, as shown in FIG. 13, the opening section N of the spacing 59 is closed with a generally used bonding material, and the bonding material is injected into the spacing 59 through the other opening section 0, for example, by the vacuum injection method as described in the second embodiment.

Both of the described methods offer the effects of minimizing the amount of use of the bonding material, and almost eliminating entering of foams into the bonding material filled in the spacing. As a result, a large liquid crystal panel in which the joints between the panels are not noticeable can be realized. Additionally, as the films 57 are formed on both surfaces of the liquid crystal panels 51, the bonding material can be prevented from overflowing on the surface of the liquid crystal panels 51. Therefore, almost no gap generates between the surface of the liquid crystal panels 51 and the bonding material filled in the spacing 59. As a result, a multi-panel liquid crystal display device having a uniform surface without generating a gap can be realized.

After hardening the bonding material filled in the spacing 59, films 57 such as PET films provided for forming the spacing 59 are removed. These films 57 can be removed with ease.

Thereafter, the reinforcing substrate 52 can be connected by the method explained in the first embodiment or the below-described method.

When connecting the liquid crystal panels 51 to the reinforcing substrate 52, the bonding material is applied onto the entire surface of the connecting sides between the liquid crystal panels 51 and the reinforcing substrate 52. Thereafter, the reinforcing substrate 52 is gradually connected to the liquid crystal panels 51 from one end.

An example method of connecting a plurality of liquid crystal panels 51 will be explained in detail in reference to figures.

The two liquid crystal panels 51 are placed on a quarts setting plate at a predetermined interval between them so as to form the multi-panel 56. Here, the interval is selected to be 50 μm. In this example, the PET films 57 having a thickness of around 400 μm are formed on both surfaces of the liquid crystal panels 51 so as to form the spacing, and the spacing 59 to be filled with the bonding material is formed by the PET film 57 and the liquid crystal panels 51. The PET films 57 and the liquid crystal panels 51 are preliminarily connected.

The ultraviolet-ray-setting bonding material is injected from the opening section L of the spacing 59 thus formed, and the spacing 59 is deaerated from the other opening section N. As a result, the bonding material can be injected into the spacing. For the ultraviolet-ray-setting bonding material, for example, a Locktight 365 (product name) having a refraction factor of 1.53. available from the Locktight Co., Ltd. may be used. As a result, at the connecting sides of the liquid crystal panel, the light can be prevented from being refracted, reflected or dispersed on the cut surface of the substrate. As a result, a natural image without having noticeable joints can be achieved.

In order to harden the bonding material filled in the spacing 59, an ultraviolet ray is projected from at least one side of the liquid crystal panels 51. Here, a high-pressure mercury lamp is used as a light source, and light having an illuminance of 30 mW/cm$^2$ is projected for 15 minutes. After the hardening of the bonding material is completed, the PET films 57 are removed.

By the described bonding method, the bonding material is filled only in the spacing between the liquid crystal panels 51. This permits the process of removing the bonding material to be eliminated, and the required amount of the bonding material can be reduced, thereby simplifying the manufacturing process, and reducing the manufacturing cost. Moreover, the entering of foams into the bonding material by dropping which is the problem associated with the conventional bonding material application method can be eliminated, and the light can be prevented from being refracted or scattered. As a result, a multi-panel liquid crystal display device in which joints are difficult to see can be realized.

[EMBODIMENT 4]

The following descriptions will discuss still another embodiment of the present embodiment in reference to figures. Members having the same functions as those of the members adopted in the aforementioned embodiments will be designated by the same reference numerals and thus the descriptions thereof shall be omitted here.

Figure 14A:
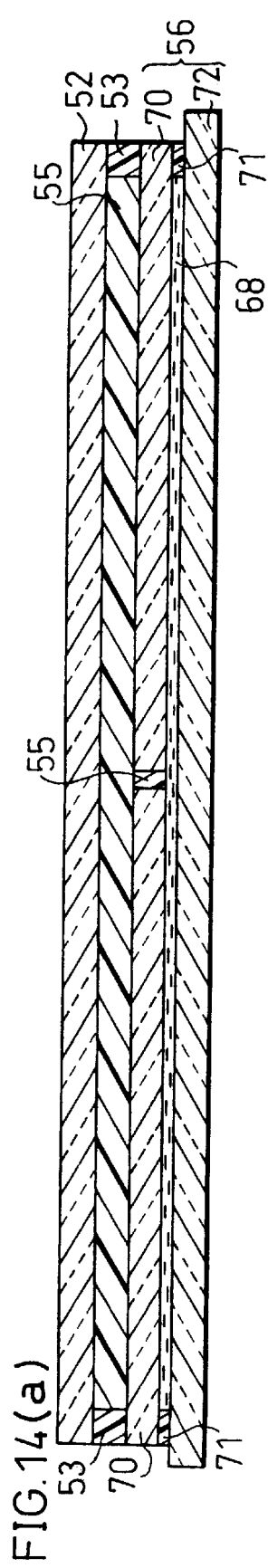
FIG. 14(a) is a cross-sectional view schematically showing a structure of a multi-panel liquid crystal display device in accordance with still another embodiment of the present invention.
Figure 14B:
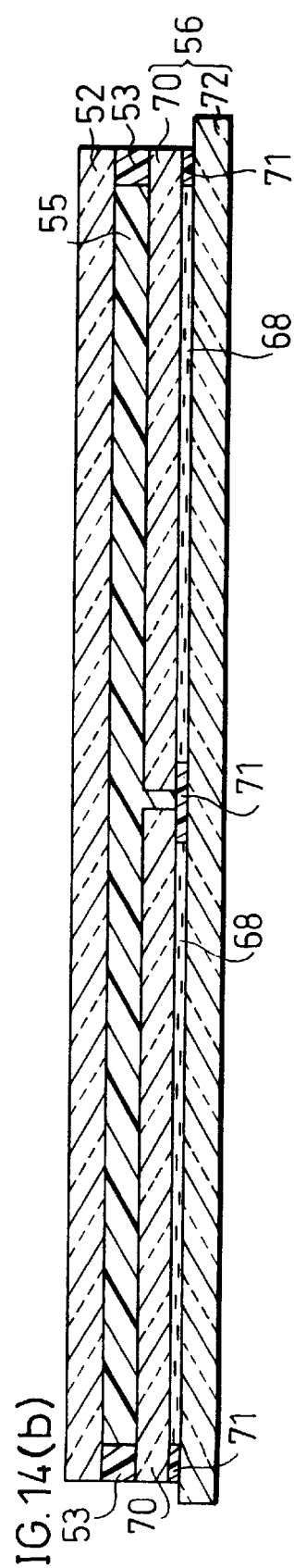
FIG. 14(b) is a cross-sectional view schematically showing another structure of the multi-panel liquid crystal display device.

As shown in FIG. 14(a) and FIG. 14(b), a multi-panel liquid crystal display device in accordance with the present invention is arranged such that a multi-panel 56 having a plurality of display surfaces are connected to the reinforcing substrate 52 through the bonding material 55.

The multi-panel 56 is arranged such that a color filter substrate 72 having the same size as the reinforcing substrate 52, and a plurality of active matrix substrates 70 having active elements such as TFTs, MIMs, etc., which are smaller than the color filter substrate 72 are connected via a liquid crystal seal material 71 (seal material) so as to face each other. Further, a liquid crystal layer 68 is enclosed between the color filter substrate 72 and the active matrix substrates 70. In the described arrangement, each active matrix substrate 70 corresponds to one display surface. The connective sides of the adjoining active matrix substrates 70 are connected by the bonding material 55. On the color filter substrate 72, the color filter, the black matrix and the overcoat layer, etc., are formed on the surface of the glass substrates 70, etc.

In the connected state of the plurality of active matrix substrates 70, the seal patterns 53 are formed by the seal material so as to surround the image display areas on the surface opposite the side where facing the color filter substrate 72, seal patterns 53 of a seal material are formed so as to surround the image display areas. The multi-panel 56 and the reinforcing substrate 52 are connected via the seal patterns 53. Then, the bonding material 55 is filled in the spacing formed by the seal patterns 53, the multi-panel 56 and the reinforcing substrate 52.

It may be arranged such that the reinforcing substrate 52 is formed also on the other surface of the color filter substrate 72 where the plurality of active matrix substrates 70 are not formed so as to sandwich the multi-panel 56 between a pair of the reinforcing substrates 52.

Next, the manufacturing method of the liquid crystal display device of the present embodiment will be explained.

In the case of adopting a structure shown in FIG. 14(a), first, a plurality of active matrix substrates 70 are placed on a plane at a predetermined interval between them, and they are connected by the bonding material 55 placed in the spacing. The plurality of active matrix substrates 70 and the color filter substrate 72 are connected via the liquid crystal seal material 71. Further, by injecting the liquid crystal into the spacing formed between the plurality of active matrix substrates 70 thus connected, the color filter substrate 72 and the liquid crystal seal material 71, the liquid crystal layer 68 is formed, thereby forming the multi-panel 56.

Thereafter, the seal patterns 53 are formed so as to surround the periphery of the image display areas on the side of the plurality of active matrix substrates 70 opposite the side where the color filter substrate 72 is formed. The reinforcing substrate 52 is connected to the multi-panel 56 via the seal patterns 53, and the bonding material 55 is injected into the spacing formed by the multi-panel 56, the reinforcing substrate 52, and the seal patterns 53, for example, by the method described in the second embodiment such as the vacuum injection method, the pressure deaeration injection method, etc.

In the case of adopting the structure shown in FIG. 14(b), seal patterns of the liquid crystal seal 71 are formed at a position so as to surround the plurality of active matrix substrates 70 on one surface of the color filter substrate 72. Then, the plurality of active matrix substrates 70 are connected to the color filter substrate 72 so as to sandwich the liquid crystal seal material 71. Then, the liquid crystal layer 68 is formed by injecting the liquid crystal into the spacing formed by the respective active matrix substrates 70, the color filter substrate 72 and the liquid crystal seal material 71.

Thereafter, seal patterns 53 are formed on the non-contacting surface of the color filter substrate 72 of the plurality of active matrix substrate 70, and the reinforcing substrate 52 and the plurality of active matrix substrate 70 are connected together via the seal patterns 53. Then, the bonding material 55 is injected by the vacuum injection method or the pressure deaeration injection method in the same manner as the first embodiment.

Figure 14C:
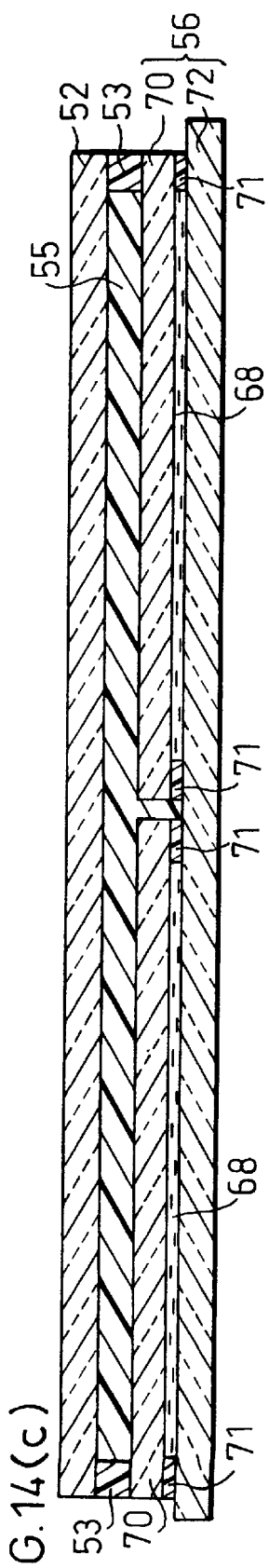
FIG. 14(c) is a cross-sectional view schematically showing another structure of the multi-panel liquid crystal display device.

According to the structure shown in FIG. 14(c), the pattern is formed by the liquid crystal seal material 71 on one surface of the plurality of active matrix substrates 70 at the peripheral portion thereof. Then, the plurality of active matrix substrates 70 are connected side to side to be connected to the surface of the color filter substrate 72 via the liquid crystal seal material 71. Then, the liquid crystal layer 68 is formed by injecting the liquid crystal into the spacing formed by the active matrix substrates 70, the color filter substrate 72 and the liquid crystal seal material 71, thereby manufacturing a multi-panel 56.

Thereafter, the seal patterns 53 are formed so as to surround the image display areas on the surface of the active matrix substrates 70 where the color filter substrate 72 is not formed. Then, the reinforcing substrate 52 and the plurality of active matrix substrates 70 are connected via the seal patterns 53, and the bonding material 55 is injected by the vacuum injection method or the pressure deaeration injection method in the same manner as the second embodiment.

According to the arrangement of the present embodiment, since the large color filter substrate 72 is adopted, the space between the adjoining plurality of active matrix substrates 70 can be shieled by the black matrix formed by the color filter substrate 72. Therefore, it is not necessary to place the black resins 58 into the spacing formed between the adjoining plurality of active matrix substrates 70 as shown in the aforementioned embodiments.

As described, the bonding material 55 filled in the spacing between the multi-panel 56 and the reinforcing substrate 52 can be prevented from being exposed to the outside air by the seal patterns 53. The bonding material 55 can be maintained in a reliable state. Additionally, since the bonding material 55 is injected after connecting the multi-panel 56 and the reinforcing substrate 52 via the seal patterns 53, the amount of use of the bonding material 55 can be reduced compared with the case of adopting the conventional level, the manufacturing cost can be reduced.

Also by adopting the large color filter substrate 72, the leakage of light from the spacing between the adjoining active matrix substrates 70 can be prevented. Thus, the need of the black resin 58 for preventing the leakage of light from the spacing can be eliminated. As a result, the manufacturing process can be simplified, and the time required for the manufacturing process can be reduced. Additionally, as the cost for the black resin 58 can be eliminated, the manufacturing cost can be reduced. Furthermore, by adopting the active matrix substrate 70 such as TFT, MIM, etc., a high-quality and large capacity active matrix multi-panel liquid crystal display device can be realized. By providing the active element on the side of the small substrates, an improved yield of the manufacturing process can be achieved.

The first manufacturing method of a liquid crystal display device in accordance with the present invention designed for a liquid crystal display device including a plurality of liquid crystal panels and a reinforcing substrate to be connected to the plurality of liquid crystal panels for connecting the plurality of liquid crystal panels side to side on the plane is characterized by including the steps of: connecting a plurality of liquid crystal panels side to side; forming a seal material so as to surround the area corresponding to the display area of the plurality of liquid crystal panels on at least one of the surfaces of the plurality of liquid crystal panels and a surface of the reinforcing substrate; forming protrusions and recessions on at least either a surface of a plurality of liquid crystal panels or a surface of the reinforcing substrate which face each other and connecting the plurality of liquid crystal panels and the reinforcing substrate and filling the bonding material into the spacing through the bonding material injection hole formed in the reinforcing substrate.

According to the first manufacturing method of the multi-panel liquid crystal display device, the plurality of liquid crystal panels are connected side to side. After forming the protrusions and recessions on the side of the reinforcing substrate where the plurality of liquid crystal panels are formed, the reinforcing substrate and the plurality of liquid crystal panels are connected via the seal material. Here, the seal material is formed so as to surround the display surfaces of the plurality of liquid crystal panels, and a spacing is formed between the reinforcing substrate and the plurality of liquid crystal panels. Thereafter, the bonding material is filled into the spacing through the bonding material injection hole; however, as the bonding material is blocked by the seal material, it can be prevented from being overflown.

Namely, according to the described arrangement, since the bonding material is filled into the spacing after connecting the reinforcing substrate to the plurality of liquid crystal panels, the amount of use of the bonding material can be minimized. As described, it is no longer necessary to waste the bonding material to the outside or from being refined. Therefore, the amount of use of the bonding material can be minimized, thereby increasing the manufacturing cost. As described, since an insufficient bonding material can be prevented from overflowing to the outside, the process of removing the bonding material and the process of removing the excessive bonding material adhering to the liquid crystal panel or the reinforcing substrate can be eliminated. Therefore, according to the described arrangement, an improved operability in the manufacturing process can be achieved, and the throughput and the mass production can be improved.

Additionally, as the protrusions and recessions are formed on the surface of the reinforcing substrate, the bonding material can be filled into the spacing of the protrusions and recessions, and the bonding material can be filled in the entire spacing with ease. As a result, it is no longer necessary to place the space holding member such as a spacer, etc., into the spacing so as to prevent the reinforcing substrate from partially contacting the plurality of liquid crystal panels. Therefore, an improved display quality can be maintained without placing the interval holding member in the display area.

The second manufacturing method of a multi-panel liquid crystal display device in accordance with the present invention having the arrangement of the first manufacturing method is characterized in that when injecting the bonding material into the spacing between the plurality of liquid crystal panels and the reinforcing substrate, the deaeration is performed through the deaeration hole, and the bonding material is pressurized.

As a result, the spacing between the plurality of liquid crystal panels and the reinforcing substrate is evacuated, and the bonding material is pressurized, thereby filling the bonding material efficiently in a short period of time.

The third manufacturing method of a multi-panel liquid crystal display device in accordance with the present invention having the arrangement of the first or second manufacturing method is characterized in that the protrusions and recessions are formed by a sandblasting method.

According to the described third manufacturing method, by adopting the sandblast method wherein a particle abrasive material is sprayed on the surface of the reinforcing substrate to make the surface coarse, the protrusions and recessions can be formed with ease.

The fourth manufacturing method of a multi-panel liquid crystal display device in accordance with the present invention based on the first or second liquid crystal display device is characterized in that the protrusions and recessions are formed by screen-printing the glass solder or the flit glass.

According to the described arrangement, by screen-printing the glass solder or the flit glass, the protrusions and recessions can be formed with ease.

The fifth manufacturing method of a multi-panel liquid crystal display device in accordance with the present invention prepared by laminating the liquid crystal multi-panel having a plurality of display screens to the reinforcing substrate is characterized by including the steps of: forming a pattern by the seal material on at least one of the liquid crystal panels and the reinforcing substrate, the process of connecting the liquid crystal multi-panel to the reinforcing substrate via the seal material while maintaining an interval between the multi-panel and the reinforcing substrate constant; the process of injecting the bonding material into the spacing formed by the liquid crystal multi-panel, the reinforcing substrate and the seal material, and the process of hardening the bonding material.

According to the fifth manufacturing method of a liquid crystal display device, a bonding material is injected into the spacing formed by the seal material, the multi-panel and the reinforcing substrate after connecting the liquid crystal panel and the reinforcing substrate via the seal material. Therefore, an amount of use of the bonding material required for connecting the liquid crystal multi-panel and the reinforcing substrate can be minimized. Therefore, the problems associated with the conventional method of of wasting of the bonding material, etc., can be eliminated, thereby reducing the manufacturing cost.

Additionally, as the bonding material can be prevented from overflowing through the spacing between the liquid crystal multi-panel and the reinforcing substrate, the process of eliminating the excessive amount of the bonding material adhering the liquid crystal multi-panel and the reinforcing substrate and the process of removing the bonding material at the peripheral portions of the liquid crystal multi-panel and the reinforcing substrate can be omitted. As a result, the manufacturing process can be simplified, and desirable mass producing techniques can be realized.

The sixth manufacturing method of a multi-panel liquid crystal display device in accordance with the present invention having the arrangement of the fifth method is characterized in that in the process of forming the pattern by the seal material, a bonding material is injected into a spacing by a vacuum injection method wherein the pattern of the seal material, at least one opening section is formed in the pattern, and in the process of injecting the bonding material, the space to which the bonding material is to be injected as well as the environment are evacuated, and the opening section is dipped into the bonding material, and the environment is resorted back to the normal pressure, thereby injecting the bonding material into the spacing.

According to the described sixth manufacturing method, by adopting the vacuum injection method, the bonding material can be injected without a problem of the entering of foams. This beneficial feature offers an improved quality. Additionally, since the vacuum injection technique is the known technique for injecting the liquid crystal, the injection line of the liquid crystal can be used as the injection line of the bonding material. As a result, a multi-panel liquid crystal display device can be realized at low cost.

The seventh manufacturing method of a multi-panel liquid crystal display device in accordance with the present invention having the arrangement of the fifth manufacturing method is characterized in that: in the process of forming the pattern of the seal material, a pressure deaeration method is adopted wherein the bonding material is injected into the spacing and the spacing is deaerated.

According to the described seventh manufacturing method, by adopting the pressure deaeration injection method, the bonding material can be injected almost without having foams entered therein. As a result, an improved quality can be achieved. Additionally, as the pressure deaeration injection method is a known technique for injecting the liquid crystal, by applying the injection line of the liquid crystal, the injection line of the bonding material can be realized. As a result, a multi-panel liquid crystal display device can be achieved at still lower cost.

The eighth manufacturing method of a multi-panel liquid crystal display device in accordance with the present invention prepared by connecting at least two liquid crystal panels together is characterized by including the process of placing liquid crystal panels on the plane at a predetermined interval and the process of injecting the bonding material into the spacing.

According to the described eighth method, since the bonding material is applied not by dropping it like the conventional arrangement but by injecting it into the spacing, the bonding material can be filled without having the foams entered into the spacing. Therefore, the refraction or scattering of light caused by foams can be eliminated, thereby manufacturing the multi-panel without making the joints noticeable.

The ninth manufacturing method of a multi-panel liquid crystal display device in accordance with the present invention having the arrangement of the fourth manufacturing method of the liquid crystal display device is characterized by further including the process of forming films on both surfaces of the liquid crystal panel so as to cover the spacing after carrying out the process of placing the liquid crystal panels in parallel.

According to the described ninth manufacturing method, by the films formed on both surfaces of the liquid crystal panel so as to cover the spacing, the bonding material can be prevented from from the surface of the liquid crystal panel through the spacing. As a result, the amount of use of the bonding material can be minimized. Additionally, the level difference between the surface of the liquid crystal panel and the bonding material can be eliminated. As a result, a multi-panel liquid crystal display device having a uniform surface can be realized.

The tenth manufacturing method of a liquid crystal display device having the arrangement of the ninth manufacturing method is characterized in that in the process of filling the bonding material, at least one of the openings is kept open, and the rest of the openings is sealed with the bonding material, and the spacing as well as its environment is evacuated, and at least one of the openings which are not sealed are dipped into the bonding material to restore the environment back to the normal pressure.

According to the described tenth manufacturing method, by adopting the vacuum injection method, the bonding material can be injected without having foams in the bonding material for use in connecting the liquid crystal panels. As a result, an improved quality can be achieved. Additionally, as the vacuum injection method is a known technique for injecting the liquid crystal, an injection line for the liquid crystal can be used as the injection line for the bonding material. As a result, a multi-panel liquid crystal display device can be realized at low cost.

The eleventh manufacturing method of a multi-panel liquid crystal display device in accordance with the present invention having the arrangement of the tenth manufacturing method of a liquid crystal display device is characterized by adopting a pressure deaeration injection method wherein the bonding material is injected through at least one opening of the spacing formed by the films, while evacuating the spacing through at least one of other openings.

According to the described method, by adopting the pressure deaeration injection method, the bonding material can be injected into the spacing without having foams in the bonding material for uses in connecting the liquid crystal panels. As a result, an improved quality can be achieved. Additionally, as the pressure deaeration injection method is a known technique for injecting the liquid crystal, the injection line of the liquid crystals can be used as the injection line of the bonding material. As a result, the multi-panel liquid crystal display device can be realized at low cost.

The first multi-panel liquid crystal display device in accordance with the present invention is characterized by including a bonding material for connecting a liquid crystal multi-panel and a reinforcing substrate together and a seal material formed so as to surround the peripheral portion of a bonding layer made of the bonding material.

According to the described arrangement, the bonding material for bonding the liquid crystal multi-panel and the reinforcing substrate can be prevented from being exposed to an outside air by the seal material. The described structure permits reliable state of the bonding material to be maintained. As a result, the liquid crystal multi-panel and the reinforcing substrate can be connected together with high precision. Further by adopting the seal material, the liquid crystal cell forming use seal material for sealing the liquid crystal between the substrates such as the thermosetting or ultraviolet-ray-setting seal material, a common material can be used for both seal materials, thereby realizing a multi-panel liquid crystal display device at low cost.

The second multi-panel liquid crystal display device in accordance with the present invention having the arrangement of the first multi-panel liquid crystal display device is characterized in that the liquid crystal multi-panel is prepared by connecting the plurality of liquid crystal panels side to side.

The third multi-panel liquid crystal display device in accordance with the present invention having the arrangement of the second multi-panel liquid crystal display device is characterized in that a black resin is formed for shielding the spacing between the adjoining liquid crystal panels.

According to the described arrangement, as the black resin blocks the light passing through the spacing between the adjoining liquid crystal panels, the leakage of light from the spacing can be eliminated completely. Therefore, the joint between the liquid crystal panels of the multi-panel can be made less noticeable.

The fourth multi-panel liquid crystal display device in accordance with the present invention having the arrangement of the first multi-panel liquid crystal display device is characterized in that the liquid crystal is sandwiched between the large substrate and the plurality of small substrates corresponding to respective display screens.

According to the arrangement of the fourth multi-panel liquid crystal display device, as a large substrate is adopted for one of the pair of the substrates having sealed therein the liquid crystal, compared with the case of adopting small substrates for both of the substrates, an occurrence of warpage, distortion, etc., can be suppressed, thereby providing a high intensity multi-panel liquid crystal display device.

The fifth multi-panel liquid crystal display device in accordance with the present invention having the arrangement of the fourth multi-panel liquid crystal display device is characterized in that:

active elements are formed on each small substrate, and color filters are formed on the large substrate.

According to the arrangement of the fifth multi-panel liquid crystal display device, by providing the active elements such as the TFTs, MIMs, etc., a high quality and large capacity active matrix multi-panel liquid crystal display device can be realized without lowering the yield. Additionally, according to the described arrangement, by providing the active elements on the side of the small substrates, an improved yield of the manufacturing process can be achieved.

Additionally, as the spacing between the adjoining liquid crystal panels can be shield by providing the black matrix to the color filter, the need of providing the black resin to the spacing can be eliminated. As a result, the process of providing the black resin can be omitted, and the cost for the black resin can be cut, thereby reducing the time required for the manufacturing processes and the manufacturing cost.

The sixth multi-panel liquid crystal display device in accordance with the present invention which includes a plurality of liquid crystal panels to be connected on a plane and a reinforcing substrate to be connected to the plurality of liquid crystal panels is characterized in that protrusions and recessions are formed on at least one of a surface of the plurality of liquid crystal panels and a surface of the reinforcing substrate which are placed so as to oppose each other.

According to the arrangement of the sixth multi-panel liquid crystal display device, as the plurality of liquid crystal panels which are prepared by connecting the plurality of liquid crystal panels to the reinforcing substrate side to side via the bonding material. As the protrusions and recessions are formed at least on one surface facing the plurality of liquid crystal panels or the reinforcing substrate, the bonding material can be filled in the spacing between the protrusions and recessions on the entire surface quickly with ease. As a result, it is no longer necessary to place the interval holding member such as the spacer, etc., into the spacing between the substrates so that the reinforcing substrate does not contact the space holding member such as a spacer, etc. Therefore, it is not necessary to place the interval holding member in the display area, and a desirable display quality can be maintained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of manufacturing a multi-panel liquid crystal display device prepared by connecting a liquid crystal multi-panel having a plurality of display surfaces to a reinforcing substrate, comprising the steps of:

(a) forming a pattern of seal material on at least one of a surface of said liquid crystal multi-panel and a surface of said reinforcing substrate so as to block a bonding material to be injected in the following step (c);

(b) connecting said liquid crystal multi-panel and said reinforcing substrate via said seal material;

(c) injecting the bonding material into a spacing formed by said liquid crystal multi-panel, said reinforcing substrate and said sealing materials; and (d) hardening said bonding material.

2. The method of manufacturing a multi-panel liquid crystal display device as defined in claim 1, wherein:

said seal material is selected from the group consisting of ultraviolet-ray setting resin, thermosetting resin, a combination of thermosetting and ultraviolet-ray setting resins, and a two-pack type epoxy resin.

3. The method of manufacturing a multi-panel liquid crystal display device as defined in claim 1, wherein:

said bonding material is an ultraviolet-ray-setting bonding material.

4. The method of manufacturing a multi-panel liquid crystal display device as defined in claim 1, wherein:

said bonding material has a refraction factor substantially equivalent to that of said reinforcing substrate.

5. The method of manufacturing a multi-panel liquid crystal display device as defined in claim 1, wherein:

said step (b) includes the step of dispersing a spacer for maintaining a spacing for injecting therethrough the bonding material into a spacing formed between said liquid crystal multi-panel and said reinforcing substrate.

6. The method of manufacturing a multi-panel liquid crystal display device as defined in claim 1, wherein:

in said step (a), said seal material is formed by a screen printing method.

7. The method of manufacturing a multi-panel liquid crystal display device as defined in claim 1, wherein:

in said step (a), said seal material is formed by a dispenser drawing method.

8. The method of manufacturing a multi-panel liquid crystal display device as defined in claim 1, further comprising the steps of:

forming an evacuation hole in said reinforcing substrate, wherein:

said step (c) includes the step of evacuating a spacing formed by said liquid crystal multi-panel, said reinforcing substrate and said seal material through said evacuation hole and pressurizing said bonding material.

9. The method of manufacturing a multi-panel liquid crystal display device as defined in claim 1, wherein:

said step (a) includes the step of forming at least one opening in the pattern, and in said step (c), a vacuum injection method is adopted wherein a bonding material is injected into a spacing by evacuating said spacing and its environment, dipping said opening into said bonding material and increasing a pressure of the environment back to normal pressure.

10. A method of manufacturing a multi-panel liquid crystal display device prepared by connecting a liquid crystal multi-panel having a plurality of display surfaces to a reinforcing substrate, comprising the steps of:

(a) forming a pattern of seal material on at least one of a surface of said liquid crystal multi-panel and a surface of said reinforcing substrate:

(b) preparing protrusions and recessions on said at least one surface of said liquid crystal multi-panel and said surface of said reinforcing substrate;

(c) connecting said liquid crystal multi-panel and said reinforcing substrate via said seal material:

(d) injecting a bonding material into a spacing formed by said liquid crystal multi-panel, said reinforcing substrate and said sealing material; and (e) hardening said bonding material.

11. The method of manufacturing a multi-panel liquid crystal display device as defined in claim 10, wherein:

said protrusions and recessions are formed by a sandblasting method.

12. The method of manufacturing a multi-panel liquid crystal display device as defined in claim 10, wherein:

said protrusions and recessions are formed by screen printing a glass solder or a flit glass.

13. The method of manufacturing a multi-panel liquid crystal display device as defined in claim 10, wherein:

said protrusions and recessions are formed in a crepe shape.

14. The method of manufacturing a multi-panel liquid crystal display device as defined in claim 10, wherein:

said protrusions and recessions are formed in a dot pattern.

15. A method of manufacturing a multi-panel liquid crystal display device prepared by connecting a liquid crystal multi-panel having a plurality of display surfaces to a reinforcing substrate, comprising the steps of:

(a) forming a pattern of seal material on at least one of a surface of said liquid crystal multi-panel and a surface of said reinforcing substrate and forming at least one opening in the pattern;

(b) connecting said liquid crystal multi-panel and said reinforcing substrate via said seal material:

(c) injecting a bonding material into a spacing formed by said liquid crystal multi-panel, said reinforcing substrate and said sealing material, said bonding material being injected by a pressure evacuation injection method wherein said bonding material is injected through at least one of said at least one opening, and the spacing is evacuated through at least one opening other than said at least one of said at least one opening; and (d) hardening said bonding material.

16. A method of manufacturing a multi-panel liquid crystal display device including at least two connected liquid crystal panels, wherein each said panel defines a top surface, a bottom surface, and a peripheral edge extending therebetween; said method comprising the steps of:

(a) placing said liquid crystal panels on a plane in edge to edge relationship with one another at a predetermined interval so as to define a spacing therebetween;

(b) filling the spacing with a bonding material; and (c) forming films on both front and rear surfaces of said liquid crystal panels so as to cover said spacing after carrying out step (a).

17. The method of manufacturing a multi-panel liquid crystal display device as defined in claim 16, wherein:

said films are PET (Polyethylene Terephthalate).

18. The method of manufacturing a multi-panel liquid crystal display device as defined in claim 16, wherein:

in step (b), a vacuum injection method is adopted wherein said films define at least one opening into said spacing, and the bonding material is injected into the spacing by evacuating the spacing and its environment, dipping said at least one opening into said bonding material, and increasing pressure of the environment back to a normal pressure.

19. The method of manufacturing a multi-panel liquid crystal display device as defined in claim 16, wherein:

in step (b), a pressure evacuation method is adopted wherein said bonding material is injected through at least one opening of said spacing formed by said films and, the spacing is evacuated through said at least one opening other than said opening.

20. A method of manufacturing a multi-panel liquid crystal display device including a plurality of liquid crystal panels to be connected on a plane and a reinforcing substrate to be connected to said plurality of liquid crystal panels, comprising the steps of:

(a) connecting said plurality of liquid crystal panels side to side;

(b) forming a bonding material injection hole in said reinforcing substrate;

(c) forming a pattern of a seal material on at least either one of a surface of said plurality of liquid crystal panels and a surface of said reinforcing substrate which face each other so as to surround a display area of said plurality of liquid crystal panels;

(d) forming protrusions and recessions on at least either one of the surface of said plurality of liquid crystal panels and the surface of said reinforcing substrate which face each other;

(e) connecting said plurality of liquid crystal panels and said reinforcing substrate via said seal material; and (f) filling said bonding material into the spacing formed by said plurality of liquid crystal panels, said reinforcing substrate and said seal material.

21. A multi-panel liquid crystal display device, comprising:

a liquid crystal multi-panel having a plurality of display surfaces on one side thereof;

a reinforcing substrate;

a sealing material connecting said one side of said liquid crystal multi-panel to a side of said reinforcing substrate so as to define a substantially closed cavity between said reinforcing substrate and said liquid crystal multi-panel; and, a bonding material substantially filling said cavity.

22. The multi-panel liquid crystal display device as set forth in claim 21, wherein:

said liquid crystal multi-panel is prepared by placing a plurality of small liquid crystal panels in parallel.

23. The multi-panel liquid crystal display device as set forth in claim 22, further comprising:

black resin for shielding a space between adjoining small liquid crystal panels.

24. The multi-panel liquid crystal display device as set forth in claim 21, wherein:

said liquid crystal multi-panel comprises a plurality of liquid crystals respectively located in sealed cells disposed between one large substrate and each of a plurality of small substrates corresponding to respective ones of said display surfaces.

25. The multi-panel liquid crystal display device as set forth in claim 24, wherein:

active elements are formed in each small substrate, and color filters are formed on said large substrate.

26. The multi-panel liquid crystal display device as set forth in claim 25, wherein:

said color filter includes a black matrix formed in the spacing between small substrates.

27. The multi-panel liquid crystal display device as set forth in claim 24, wherein:

a same material is adopted for said bonding material and for sealing said cells.

28. A multi-panel liquid crystal display device, comprising:

a liquid crustal multi-panel having a plurality of display surfaces;

a reinforcing substrate to be connected to said liquid crystal multi-panel;

a bonding material for connecting said liquid crystal multi-panel and said reinforcing substrate;

a seal material formed so as to surround a periphery of a bonding layer made of said bonding material; and protrusions and recessions formed on at least one of a surface of said liquid crystal multi-panel and a surface of said reinforcing substrate which face each other.

* * * * *